United States Patent [19]
Morris

[11] Patent Number: 6,101,058
[45] Date of Patent: Aug. 8, 2000

[54] METHOD OF IMPLEMENTING A LINEAR DISCRETE-TIME STATE-SPACE SERVO CONTROL SYSTEM ON A FIXED-POINT DIGITAL SIGNAL PROCESSOR IN A DISC DRIVE

[75] Inventor: John C. Morris, Minneapolis, Minn.

[73] Assignee: Seagate Technology, Inc., Scotts Valley, Calif.

[21] Appl. No.: 09/026,457

[22] Filed: Feb. 19, 1998

Related U.S. Application Data

[60] Provisional application No. 60/055,126, Aug. 7, 1997.

[51] Int. Cl.$^7$ .................................................. G11B 15/18
[52] U.S. Cl. ........................... 360/69; 360/75; 360/78.09
[58] Field of Search ............................. 360/78.09, 78.05, 360/77.04, 78.04

[56] References Cited

U.S. PATENT DOCUMENTS

| | | | |
|---|---|---|---|
| 5,189,578 | 2/1993 | Mori et al. ......................... | 360/78.05 X |
| 5,325,244 | 6/1994 | Takano et al. ........................ | 360/77.03 |
| 5,404,253 | 4/1995 | Painter ................................. | 360/77.04 |
| 5,444,583 | 8/1995 | Ehrlich et al. ........................ | 360/78.09 |
| 5,452,275 | 9/1995 | Ogawa .............................. | 360/78.05 X |
| 5,465,034 | 11/1995 | Andrews, Jr. et al. ................. | 318/560 |
| 5,475,545 | 12/1995 | Hampshire et al. .................. | 360/78.06 |
| 5,519,605 | 5/1996 | Cawlfield ................................ | 364/151 |
| 5,566,095 | 10/1996 | Cameron et al. ................... | 364/571.01 |
| 5,668,680 | 9/1997 | Tremaine .......................... | 360/78.09 X |
| 5,745,319 | 4/1998 | Takekado et al. .................... | 360/78.05 |

OTHER PUBLICATIONS

"Experimental Control and Model Validation: A Helicopter Case Study", by John C. Morris, 1996, California Institute of Technology, Pasadena, California.

"Model Validation, Control, and Computation" by Matthew Philip Newlin, 1996, California Institute of Technology, Pasadena, California.

"The Complex Structured Singular Value", by A. Packard and J. Doyle, *The Journal of IFAC*, Jan. 1993, vol. 29, No. 1, pp. 71–109.

"Analysis of Feedback Systems With Structured Uncertainties", by John Doyle, *IEEE Proc.*, vol. 129, No. 6, Nov. 1982, pp. 242–250.

"Performance and Robustness Analysis for Structured Uncertainty", by John C. Doyle, et al., *IEEE*, 1982, pp. 629–636.

"Structured Uncertainty in Control System Design", by John C. Doyle, *IEEE*, 1985, pp. 260–265.

"$\mu$–Synthesis—A Non–Conservative Methodology for Design of Controllers with Robustness Towards Dynamic and Parametric Uncertainty", by Steen Toffner–Clausen and Palle Andersen, admitted prior art.

*Primary Examiner*—Paul Loomis
*Assistant Examiner*—K. Wong
*Attorney, Agent, or Firm*—Joseph R. Kelly; Westman, Champlin & Kelly, P.A.

[57] ABSTRACT

A method of implementing a model based servo controller in a digital signal processor in a disc drive includes obtaining matrices for a discrete-time state-space realization of the servo controller. Controller states of the controller are scaled to reduce a worst case bound on the controller states. The controller states are transformed to a desired format which reduces a number of required mathematical operations. Further, the matrices are converted to fixed point format.

15 Claims, 13 Drawing Sheets

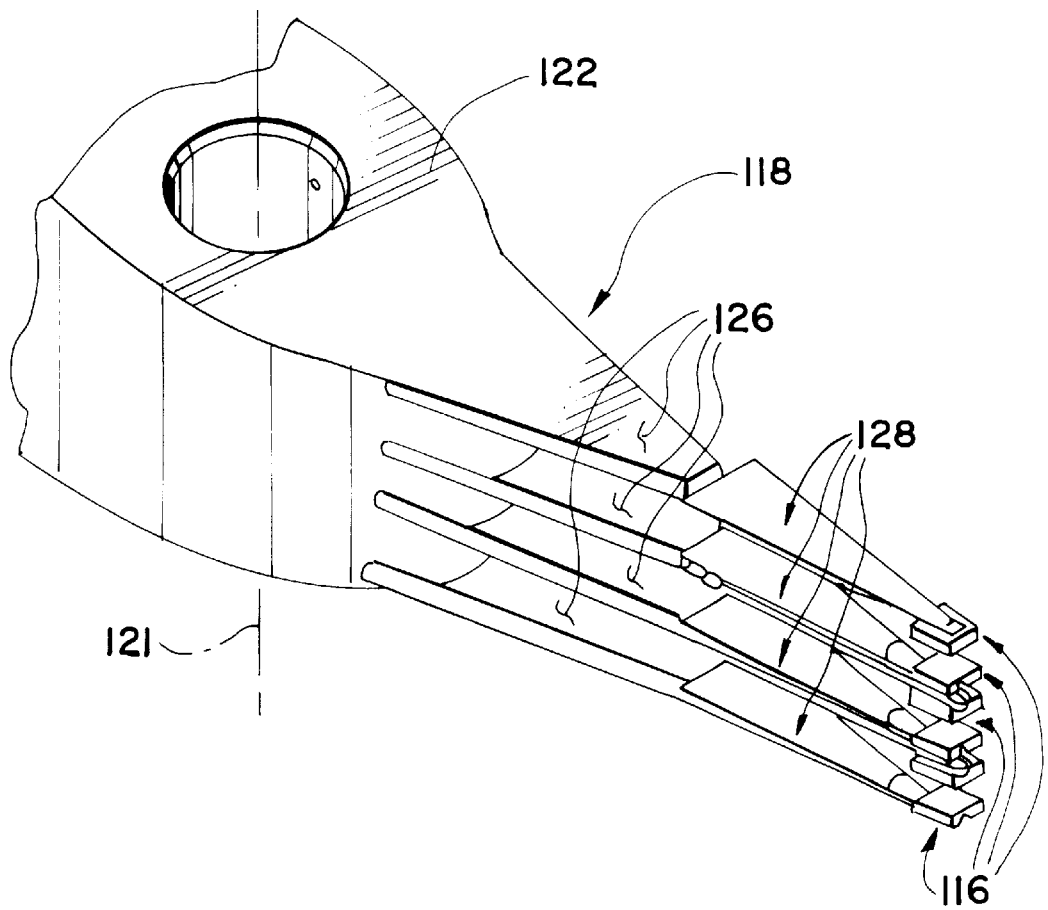
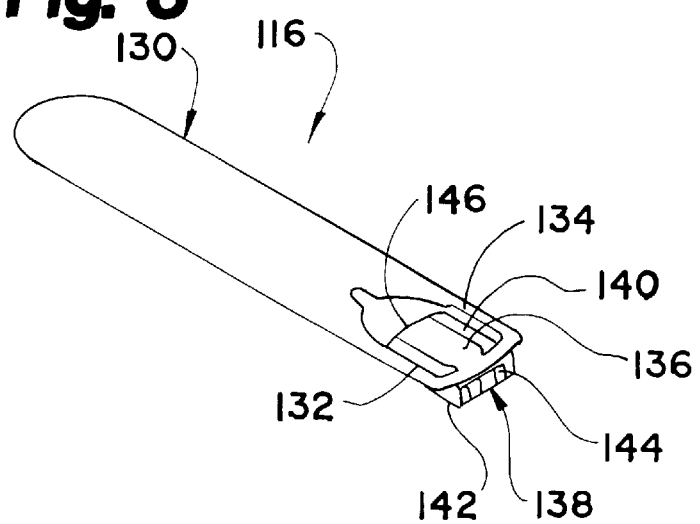

METHOD OF IMPLEMENTING A LINEAR DISCRETE-TIME STATE-SPACE SERVO CONTROL SYSTEM ON A FIXED-POINT DIGITAL SIGNAL PROCESSOR IN A DISC DRIVE

REFERENCE TO CO-PENDING APPLICATION

The present invention claims priority to Provisional Application Ser. No. 60/055,126, filed Aug. 7, 1997 and entitled TRACK FOLLOWING CONTROL OF A HIGH PERFORMANCE DISC DRIVE.

Reference is also made to co-pending U.S. patent application Ser. No. 09/026,259, filed on Feb. 19, 1998 entitled MODEL VALIDATION ALGORITHM FOR CHARACTERIZING PARAMETERS AND UNCERTAINTY IN A DISC DRIVE and U.S. patent application Ser. No. 09/026,455, filed Feb. 19, 1998 entitled DISC DRIVE WITH ROBUST TRACK FOLLOWING SERVO CONTROLLER.

Reference is also made to the following articles which are publicly available from the institutions mentioned: Matthew P. Newlin, *Model Validation, Control, and Computation*, Ph.D. THESIS California Institute of Technology, 1996; and John C. Morris, *Experimental Control and Model Validation: A Helicopter Case Study*, Ph.D. THESIS, California Institute of Technology, 1996.

FIELD OF THE INVENTION

The present invention relates generally to a servo system in a disc drive. More particularly, the present invention relates to implementing a model-based robust servo control system in a disc drive.

BACKGROUND OF THE INVENTION

A typical disc drive includes one or more magnetic discs mounted for rotation on a hub or spindle. A typical disc drive also includes one or more transducers supported by a hydrodynamic air bearing which flies above each magnetic disc. The transducers and the hydrodynamic air bearing are collectively referred to as a data head. A drive controller is conventionally used for controlling the disc drive system based on commands received from a host system. The drive controller controls the disc drive to retrieve information from the magnetic discs and to store information on the magnetic discs.

An electromechanical actuator operates within a negative feedback, closed-loop servo system. The actuator typically includes an actuator arm that supports a flexure of flexure assembly which, in turn, supports the data head. The actuator moves the data head radially over the disc surface for track seek operations and holds the transducer directly over a track on the disc surface for track following operations.

Information is typically stored on the magnetic discs by providing a write signal to the data head to encode flux reversals on the surface of the magnetic disc representing the data to be stored. In retrieving data from the disc, the drive controller controls the electromechanical actuator so that the data head flies above the magnetic disc, sensing the flux reversals on the magnetic disc, and generating a read signal based on those flux reversals. The read signal is then decoded by the drive controller to recover the data represented by flux reversals stored on a magnetic disc, and consequently represented in the read signal provided by the data head.

Accurate positioning of the data head over a track on the disc is of great importance in writing data to the disc and reading data from the disc.

In prior systems, servo operations were accomplished based on a dedicated servo head. In a dedicated servo type of system, servo information is all written to one dedicated surface of a disc in the disc drive. All of the heads in the disc drive are mechanically coupled to the servo head which is used to access the servo information. Thus, all of the heads in the dedicated servo disc drive are positioned based on the servo information read from the servo surface. This type of system allows the disc drive to conveniently execute parallel read and write operations. In other words, with appropriate circuitry in the drive controller, read and write operations can be executed in parallel using a plurality of the data heads mounted on the actuator, the data heads being simultaneously positioned based on the servo information read from the dedicated servo surface.

However, track densities on magnetic discs have been increasing for many years. Increased track densities on the magnetic disc require more accurate and higher resolution positioning. The mechanical offset between heads in a dedicated servo system can exceed one track width. Thus, the industry has seen a shift to embedded servo information in certain applications.

In an embedded servo system, servo information is embedded on each track on each surface of every disc. Thus, each data head returns a position signal independently of the other data heads. Therefore, the servo actuator is used to position each individual data head while that particular data head is accessing information on the disc surface. The positioning is accomplished using the embedded servo data for the track over which the data head is then flying.

While this results in increased positioning accuracy and higher resolution in the positioning process (because the data head is positioned independently of any other data heads), certain disadvantages are encountered because of increased track density and mechanics. One of the disadvantages is that in typical embedded servo systems, the ability to execute parallel read and write operations using a plurality of heads is lost. That is because the servo system is positioning based on information received by one individual data head, and the mechanical tolerances are inadequate to accurately position the other data heads in high track density systems. Also, current actuators are incapable of independently positioning the data heads. Thus, embedded servo systems, to date, have been unable to execute parallel read and write operations, such as simultaneously reading or writing a full cylinder in a disc drive.

Because of these differences between dedicated and embedded servo systems, there is a trade off between servo sample rate and efficient user data storage.

In addition, there are many issues in both systems which affect the positioning accuracy and precision of the servo system. Some of the most important issues include the following:

1. Servo sample rate. The sample rate is limited by the spindle speed and the number of servo sectors per track in an embedded servo system.

2. Structural modes in the arm and head suspension.

3. External shock and vibration, which can be either linear or rotational or both.

4. Written-in position error which results from tracking errors which occurred when the servo tracks were written. This results in repeatable runout. Runout refers to the total positioning error while executing a track following operation. Runout is typically referred to as a static deviation while tracking over long periods of time. Because written-in position error is synchronized to the spindle speed, it is referred to as repeatable runout.

5. Bearing non-linearities. Such non-linearities result in rotational drag and hysteresis, particularly when the actuator is moving at low velocities.

6. Non-linearity due to flex circuit bias forces on the actuator. In other words, the actuator is coupled to the disc drive controller through a flex circuit. When the actuator positions the transducer at different radial positions on the disc, the flex circuit bias forces on the actuator can change.

7. Disc flutter which results in non-repeatable runout. The amount of disc flutter is dependent on the spindle speed and the stiffness of disc substrate.

8. Gain variation resulting from magnetic transducer non-linearity cross-track.

9. Position error sample noise resulting from media magnetic variability, electronic noise, etc.

Prior conventional servo controllers have included proportional-integral-derivative (PID) controllers which are composed of two components: an observer and a regulator. The observer receives input position information each time a servo sector is crossed, and estimates position and velocity. The regulator then provides feedback on the observed signals. In a seek mode, the regulator typically zeros the error between a reference velocity trajectory and the observed velocity. In track following mode, the regulator zeros the error between the desired track position and the observed track position. The regulator controls according to a PID control technique.

However, PID controllers may not be advantageous or desirable in all disc drive applications. For example, it may be desirable to provide microactuators between the flexure assembly and the transducer or slider assembly, or on the actuator arm, or on the suspension or flexure assembly. Where microactuators are provided, the servo actuator system evolves from a single input single output (SISO) system where the input is an error signal and the output is a voice coil current signal, to a multiple input multiple output (MIMO) system which receives a variety of inputs from the microactuators and provides a position output signal to the voice coil motor and each of the microactuators. While such a system could be controlled by simply decentralizing a PID controller, this may present problems. For example, if a plurality of heads are simultaneously positioned, the positioning of one data head can be affected by the simultaneous positioning of adjacent or proximate other data heads. Further, high bandwidth positioning can excite the structural modes of the drive and cause vibration, ringing, or other interference which can tend to interfere with the positioning of adjacent data heads.

In addition, a number of problems present themselves when attempting to implement a discrete-time system on a fixed-point digital signal processor in a disc drive. For example, the computation capability provided in digital signal processors which may be used in a disc drive is typically quite limited. This raises a number of significant issues. The size and number of registers in a digital signal processor can be quite limited. When performing matrix calculations, the number of bits required to store the results of intermediate calculations may exceed the capacity of the registers in the digital signal processor. Thus, overflow presents a significant hurdle. In addition, the computation speed and structure, as well as the memory capacity, in a digital signal processor can make some matrix calculations highly impractical, simply due to the number of calculations which must be performed. Also, substantially all digital signal processors are fixed-point processors. Thus, implementing a linear discrete-time system in a digital signal processor can be highly impractical. Further, quantization errors in a conventional DSP can become appreciable rendering the control accuracy of the DSP in a servo system in the disc drive impractical.

The present invention addresses at least some of these and other problems, and offers other advantages over the prior art.

SUMMARY OF THE INVENTION

The present invention is directed to a system which addresses one or more of the above-mentioned problems.

A method of implementing a model based servo controller in a digital signal processor in a disc drive includes obtaining matrices for a discrete time state-space realization of the servo controller. Controller states of the controller are scaled to reduce a worst case bound on the controller states. The controller states are transformed to a desired format which reduces a number of required mathematical operations. Further, the matrices are converted to fixed point format.

BRIEF DESCRIPTION OF THE DRAWINGS

FIG. 2 illustrates an actuator assembly in accordance with one embodiment of the present invention.

FIG. 3 illustrates a head gimbal assembly in accordance with one feature of the present invention.

FIGS. 9-1 to 9-4 illustrate examples of additive and multiplicative uncertainty and weighting functions in accordance with one aspect of the present invention.

FIGS. 10-1 to 10-3 are graphs illustrating estimated additive and multiplicative uncertainty and phase error on an actual disc drive.

DETAILED DESCRIPTION OF THE PREFERRED EMBODIMENTS

Figure 1:
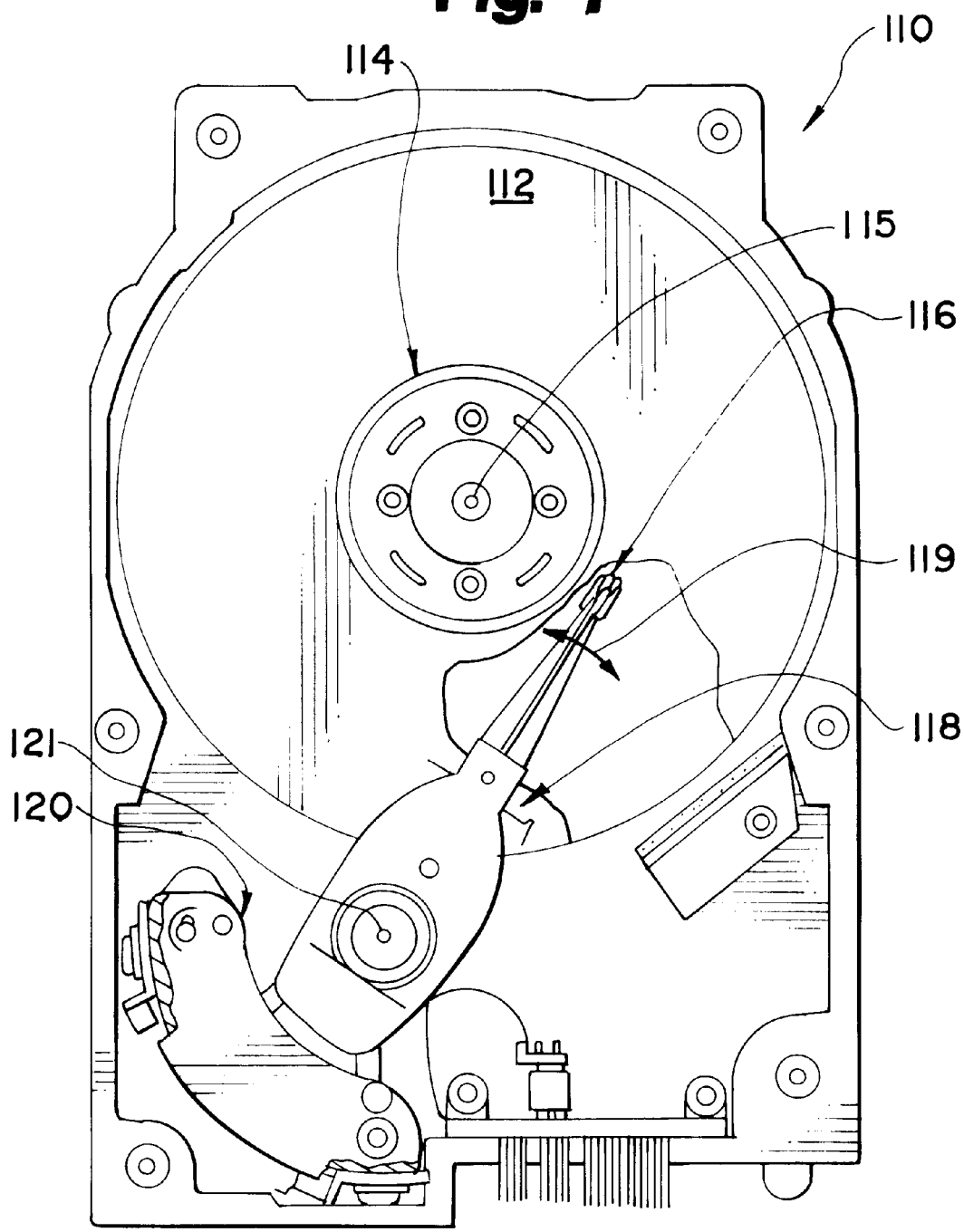
FIG. 1 illustrates a disc drive in accordance with one embodiment of the present invention.

FIG. 1 is a plan view of a typical disc drive 110. Disc drive 110 includes a disc pack 112, which is mounted on a spindle motor (not shown) by a disc clamp 114. Disc pack 112, in one preferred embodiment, includes a plurality of individual discs which are mounted for co-rotation about a central axis 115. Each disc surface on which data is stored has an associated head gimbal assembly (HGA) 116 which is mounted to an actuator assembly 118 in disc drive 110. The actuator assembly shown in FIG. 1 is of the type known as a rotary moving coil actuator and includes a voice coil motor (VCM) shown generally at 120. Voice coil motor 120 rotates actuator assembly 118 with its attached HGAs 116 about a pivot axis 121 to position HGAs 116 over desired data tracks on the associated disc surfaces, under the control of electronic circuitry housed within disc drive 110.

More specifically, actuator assembly 118 pivots about axis 121 to rotate head gimbal assemblies 116 generally along an arc 119 which causes each head gimbal assembly 116 to be positioned over a desired one of the tracks on the surfaces of discs in disc pack 112. HGAs 116 can be moved from tracks lying on the innermost radius, to tracks lying on the outermost radius of the discs. Each head gimbal assembly 116 has a gimbal which resiliently supports a slider relative to a load beam so that the slider can follow the topography of the disc. The slider, in turn, includes a transducer which is utilized for encoding flux reversals on, and reading flux reversals from, the surface of the disc over which it is flying.

Figures 1, 9:
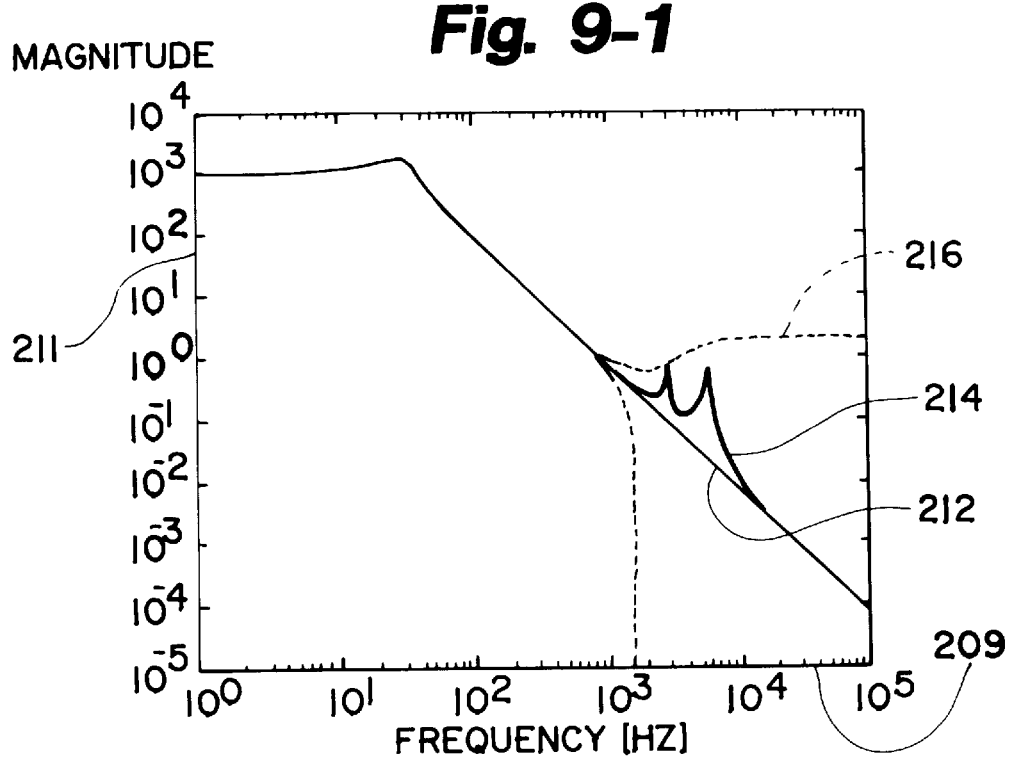
Figures 2, 9:
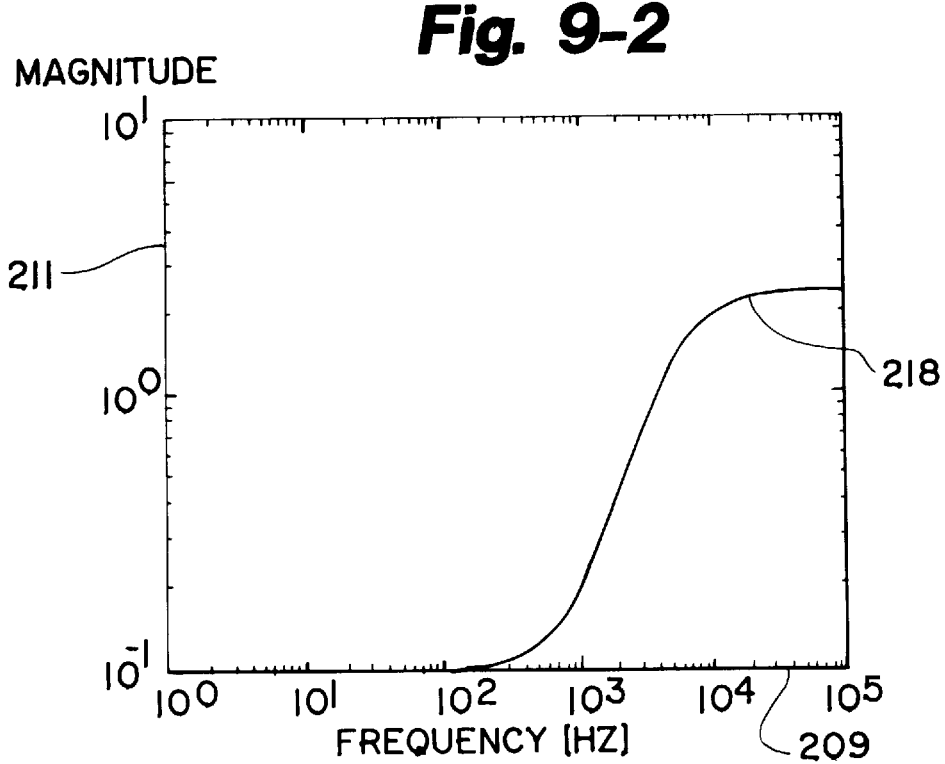

FIG. 2 is a perspective view of actuator assembly 118. Actuator assembly 118 includes base portion 122, a plurality of actuator arms 126, a plurality of load beams 128, and a plurality of head gimbal assemblies 116. Base portion 122 includes a bore which is, in the preferred embodiment, coupled for pivotal movement about axis 121. Actuator arms 126 extend from base portion 122 and are each coupled to the first end of either one or two load beams 128. Load beams 128 each have a second end which is coupled to a head gimbal assembly 116.

Figures 3, 9:
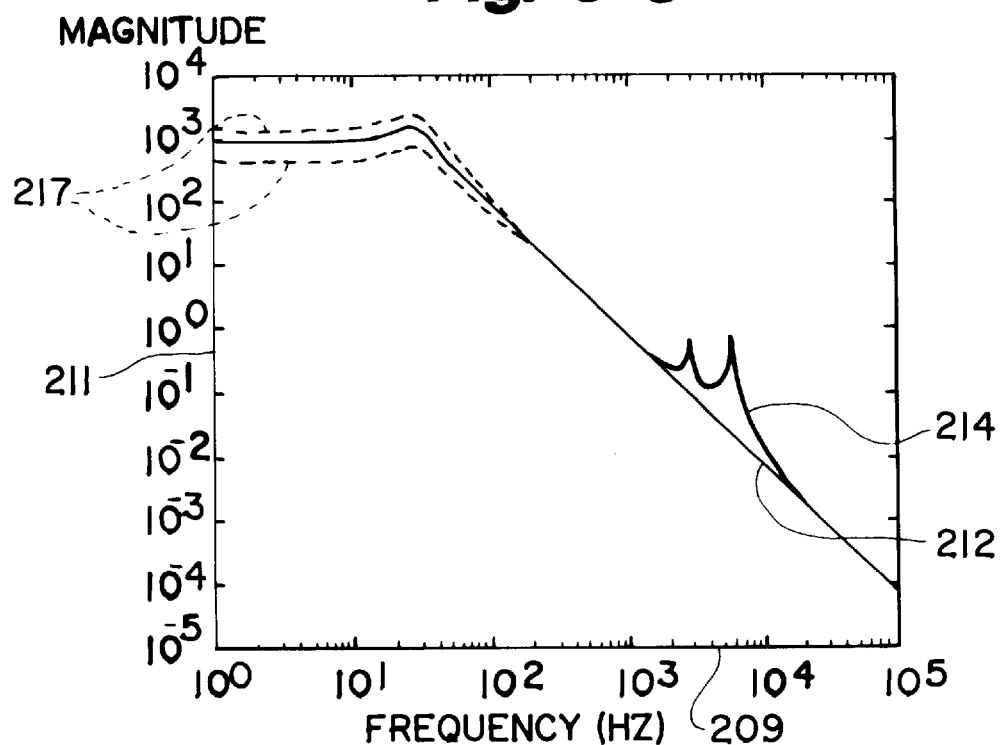
Figures 4, 9:
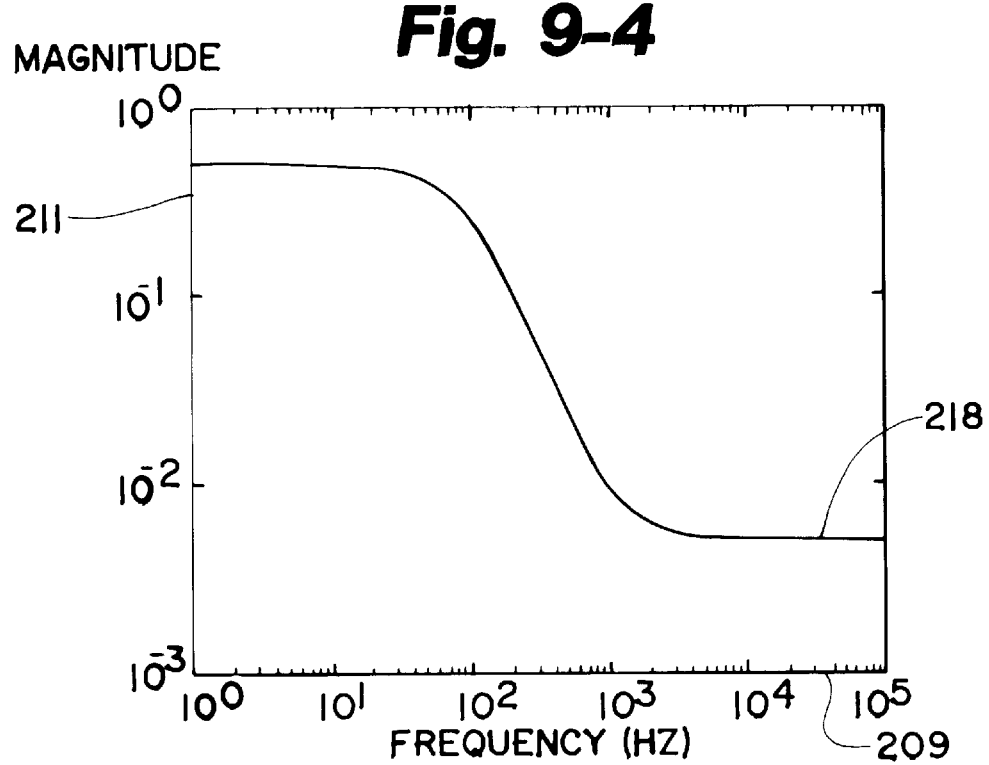

FIG. 3 illustrates a greatly enlarged view of a head gimbal assembly 116. Head gimbal assembly 116 includes gimbal 130, which has a pair of struts 132 and 134, and a gimbal bond tongue 136. Head gimbal assembly 116 also includes slider 138 which has an upper surface 140 and a lower, air bearing surface 142. Transducers 144 are also preferably located on a leading edge of slider 138. The particular attachment between slider 138 and gimbal 130 is accomplished in any desired manner. Briefly, in one preferred embodiment, a compliant sheer layer is preferably coupled between the upper surface 140 of slider 138 and a lower surface of gimbal bond tongue 136, with an adhesive. The compliant sheer layer permits relative lateral motion between slider 138 and gimbal bond tongue 136. The compliant sheer layer is preferably a mylar film having a thickness of approximately 150 microns. Also, gimbal bond tongue 136 preferably terminates at a trailing edge of slider 138 with a mounting tab 146 which provides a surface at which slider 138 is attached to gimbal bond tongue 136.

Figure 4:
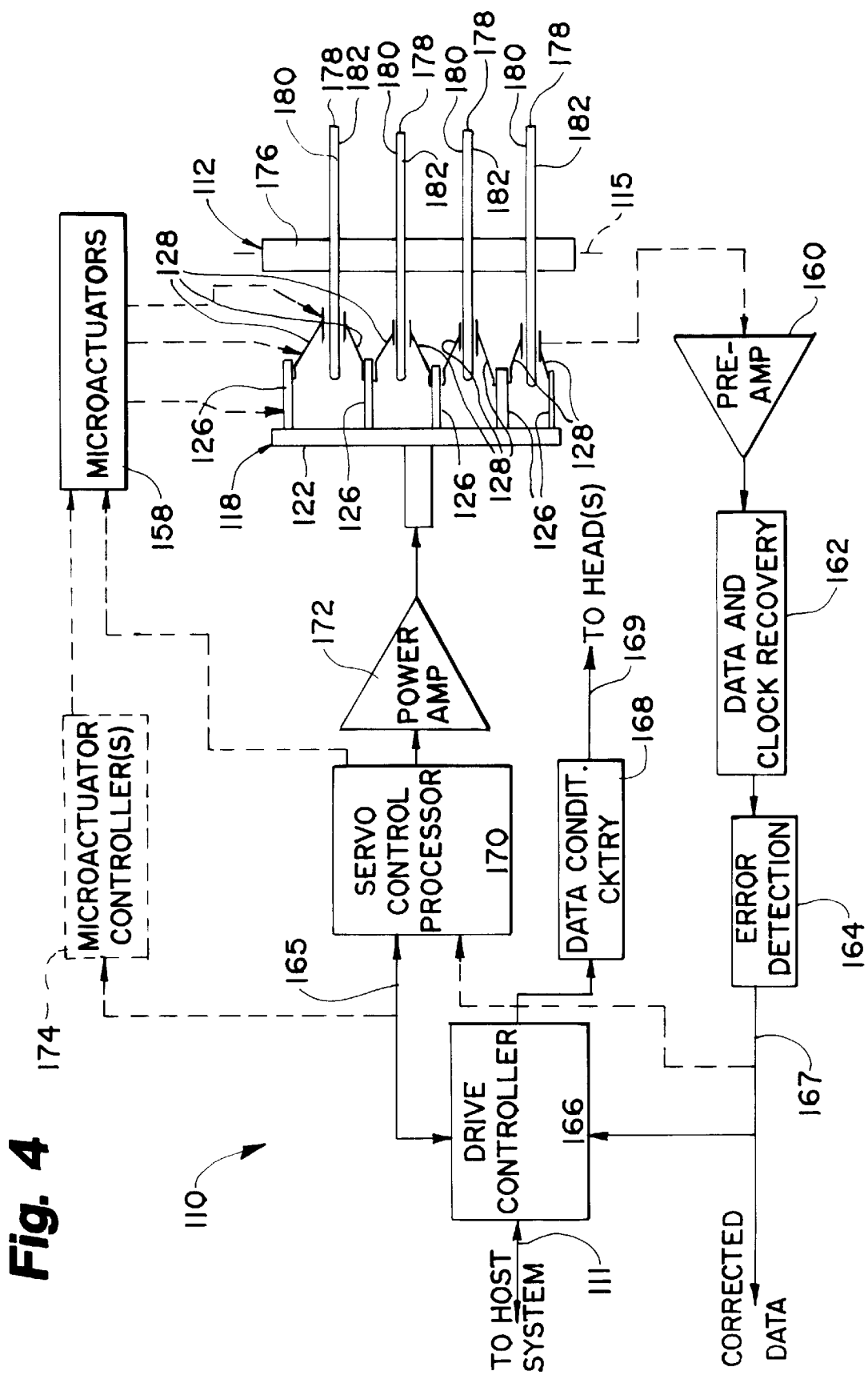
FIG. 4 is a block diagram of a portion of the disc drive in accordance with one embodiment of the present invention.

FIG. 4 is a block diagram of a portion of a disc drive 110, which illustrates a servo position control circuit in accordance with one aspect of the present invention. The portion of disc drive 110 which is illustrated in FIG. 4 includes actuator assembly 118, disc pack 112, microactuators associated with each head gimbal assembly (collectively referred to as microactuators 158), preamplifier 160, data and clock recovery circuit 162, error detection circuit 164, drive controller 166, data conditioning circuit 168, servo control processor 170, power amplifier 172, and optional microactuator controller(s) 174.

Drive controller 166 is preferably a microprocessor or digital computer, or other suitable microcontroller, and is coupled by bus 111 to a host system or another drive controller which controls the plurality of drives.

Disc pack 112 includes spindle 176 which supports a plurality of coaxially arranged discs 178. Each disc 178 is mounted for rotation with spindle 176 about axis of rotation 115. Each disk 178 has a first surface 180 and a second surface 182. Surfaces 180 and 182 include concentric tracks for receiving and storing data in the form of flux reversals encoded on the tracks.

As described with respect to FIGS. 2 and 3, actuator assembly 118 includes base portion 122 supporting the plurality of actuator arms 126. Each of the actuator arms 126 is coupled to at least one of the load beams 128. Load beams 128, in turn, each support one of the head gimbal assemblies 116 (labeled in FIG. 3) above corresponding disc surfaces 180 or 182 for accessing data within the tracks on the disc surface. Each gimbal assembly also includes at least one microactuator 158 for positioning the transducers on the head gimbal assemblies within a track, or on one of a plurality of different tracks, on disc 178. As illustrated in FIG. 4, microactuators 158 can be provided on actuator arms 126, on load beams 128, on gimbals (or other flexures) 130, between gimbal 130 and associated sliders, or at any other suitable location. The microactuators 158 can be formed of PZT material, electrostatic material arranged to deflect accordingly, capacitive, fluidic, electromagnetic, magnetostatic, or thermally activated.

In operation, drive controller 112 typically receives a command signal from a host system which indicates that a certain portion of one or more of discs 178 are to be accessed. In response to the command signal, drive controller 166 provides servo control processor 170 with a position (or reference) signal 165 which indicates a particular cylinder over which actuator assembly 118 is to position head gimbal assemblies 116. Servo control processor 170 converts the position signal into an analog signal which is amplified by power amplifier 172 and is provided to the voice coil motor in actuator assembly 118. In response to the analog position signal, actuator assembly 118 positions load beams 128 and their associated head gimbal assemblies 116 over a desired cylinder.

The head gimbal assemblies 116 generate a read signal containing data from embedded servo position data which is stored on a selected portion of each track of the disc to be read, as well as normal data to be accessed from the selected portion of the disc to be read. The read signal is provided to preamplifier 160 which amplifies the read signal and provides it to data and clock recovery circuit 162. Data and clock recovery circuit 162 recovers data from the read signal, which is encoded on the disc surface when the data is written to the disc surface, in a known manner. Of course, data and clock recovery circuit 162 can be a partial response maximum likelihood (PRML) channel, or another suitable type of read channel.

Once the data is recovered, it is provided to error detection circuit 164 which detects whether any errors have occurred in the data read back from the disc and which provides an output 167. Errors are corrected by error detection circuit 164 or drive controller 166, or a combination of both, in a known manner.

During head positioning, drive controller 166 provides a position signal to servo control processor 170 causing actuator assembly 118 to position head gimbal assemblies 116 over a selected cylinder. In a sector servo positioning drive (or an embedded servo positioning drive), a portion of each sector on the disc surfaces has position information which is encoded thereon and which is read by the data head and provided, through the read channel, to servo control processor 170. The positioning information not only gives coarse position information indicating the particular track over which the data head is flying, it also provides tuning feedback to the servo control processor for better positioning. Servo control processor 170 reacts to the position information read from the disc and positions the head gimbal assemblies 116 accordingly.

In one preferred embodiment, servo control processor 170 is used to not only control the coarse actuator (voice coil motor) but it is also used to control the microactuators 158. In another preferred embodiment, a separate microactuator controller (or plurality of separate microactuator controllers) 174 are provided for controlling the microactuators 158 in response to the position request signal from drive controller 166 and also in response to the embedded position information read from the discs.

In order to write information to the discs, drive controller 166 receives not only the location of the information to be written on disc pack 112, but also receives the actual data to be written. The location information is provided to servo control processor 170 (and optionally microactuator controller(s) 174) as a reference signal to coarsely position the data heads relative to the corresponding disc surfaces. Then, drive controller 166 provides the data to be written to data conditioning circuitry 168, which in turn provides that information at an output 169 to the particular transducers on the head gimbal assemblies 116 so that the data can be written to the disc surfaces, in a known manner.

In the preferred embodiment, microactuators 158 have a range of motion which is in excess of the worst case mechanical misalignment between any two of the head assemblies 116 supported by actuator assembly 118. In an even more preferred embodiment, each microactuator 158 has a range of motion which is in excess of one track width, and even more preferably in excess of a plurality of track widths. Also, in the preferred embodiment, the read channel provided in disc drive 110 (which in the embodiment shown in FIG. 4 includes preamp 160, data and clock recovery circuit 162 and error detection circuit 164) is capable of receiving a plurality of simultaneous and parallel data signals and processing those data signals in parallel, and providing them to the host system, and/or drive controller 166 in parallel. Further, in the preferred embodiment, data conditioning circuitry 168 is also preferably suitable for providing a plurality of simultaneous and parallel write signals to the data heads to execute a simultaneous and parallel write operation. Further, in the preferred embodiment, servo controller processor 170 and optional microactuator controller(s) 174 are suitable for simultaneously providing positioning signals to microactuators 158 to simultaneously position all, or at least a plurality of, the microactuators so that a plurality of heads can be simultaneously aligned with tracks on a plurality of disc surfaces in disc pack 112.

With this arrangement, a number of advantages are achieved. For example, precise position control can be accomplished on each of a plurality of the data heads. This allows precise and simultaneous track following on the plurality of data heads to allow parallel read and write operations. Further, because the bandwidth of the microactuator operation is much higher than that of the voice coil motor, this arrangement provides the ability to significantly increase the track density on any given disc surface because it accommodates bearing non-linearity, and other problems which limit the track density of the current art, in a far superior fashion to simply using the voice coil motor for track following.

Further, since in the preferred embodiment, each microactuator has a range of motion which is in excess of a plurality of data tracks, the microactuators, themselves, can be used to execute short seek operations (seek operations which seek to a track within the range of motion of the microactuator). This minimizes the excitation of structural modes in the disc drives and enables higher bandwidth servo-control during the short seeks.

Microactuators 158 can be controlled in any of a number of ways in accordance with the present invention. For example, the voice coil motor in a conventional disc drive is controlled by a servo controller which is a single input/singe output (SISO) system. The input is the head position measurement taken from the embedded servo data, and the output typically drives the voice coil motor through the power amplifier 172. However, in controlling microactuators 158, the servo control system of the present invention must have multiple inputs and multiple outputs. The inputs include the head positions read from the embedded servo information over which the heads are flying, and may also optionally, include the relative positions of one or more of the microactuators, relative to the voice coil motor (or coarse actuator). The multiple outputs include the outputs which drive the single coarse positioner (VCM) and a number N of the microactuators.

A potential problem which presents itself to the present architecture in which a plurality of data heads are simultaneously positioned is that the positioning of one data head can be affected by the simultaneous positioning of adjacent or proximate other data heads. High bandwidth positioning can excite the structural modes of the drive and cause vibration or other interference which can interfere with the positioning of adjacent data heads. Thus, in a preferred embodiment of the present invention, the servo control processor 170 or microactuator controller(s) 174 account for the movement of other data heads on actuator assembly 118.

A preferred arrangement is to include a single servo controller including a MIMO servo controller implemented as a digital signal processor (DSP). The DSP has inputs indicating the head position of each head, the relative position of each microactuator and the reference signal from either the host controller, or from the disc drive controller 166.

Figure 5:
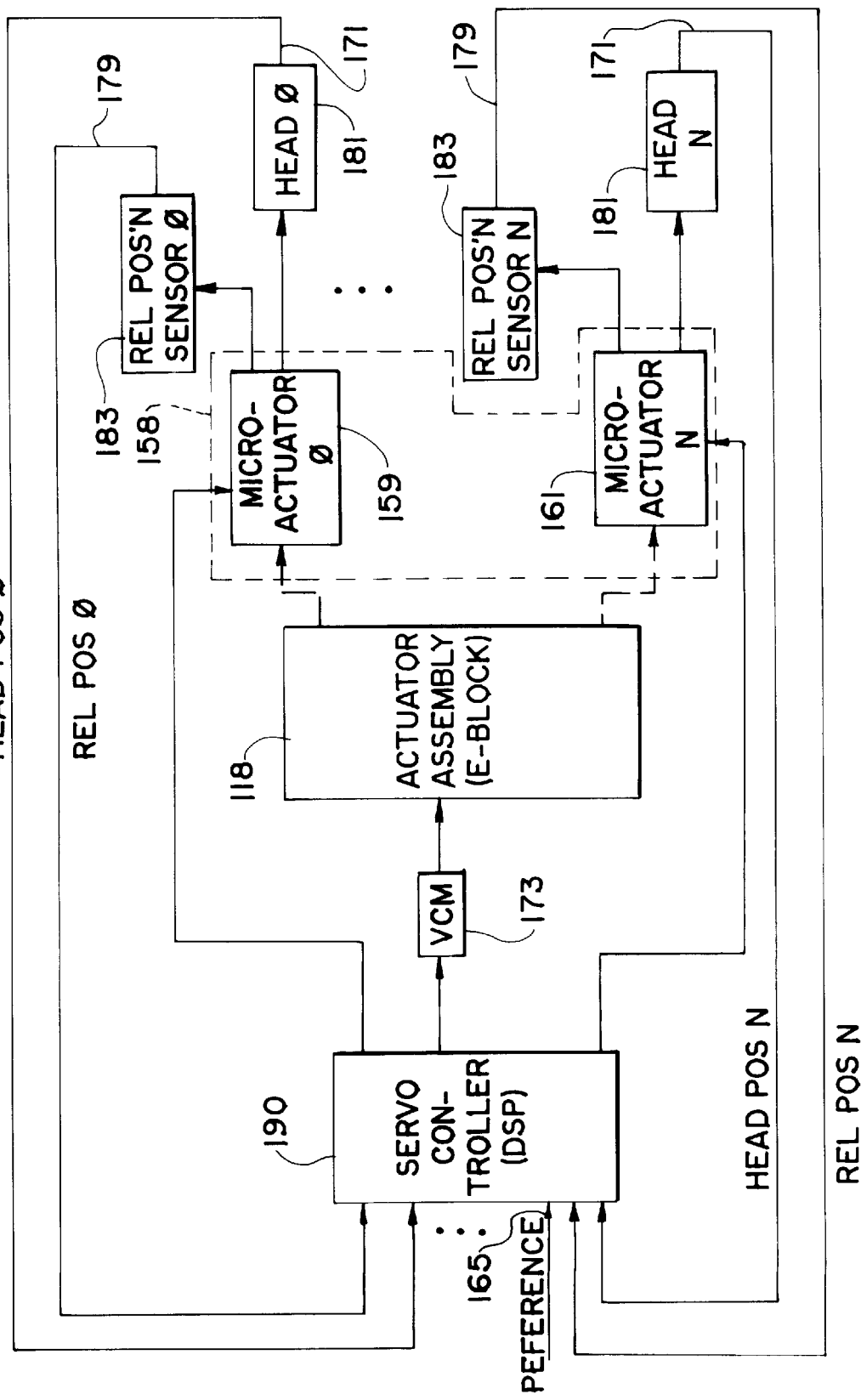
FIG. 5 is a block diagram of a portion of a servo control circuit in accordance with one embodiment of the present invention.

FIG. 5 illustrates an embodiment in which servo control processor 170 and microactuator controller 174 are combined into such a single servo controller, implemented as a DSP 190. DSP 190 receives as its inputs a reference signal 165 from the host system or disc drive controller 166, along with head position signals for each of the heads 181 (head 0—head N) which is indicative of the position of the head. An output from DSP 190 is provided to voice coil motor (VCM) 173 which drives actuator assembly (or E-block) 118. FIG. 5 also illustrates that DSP 190 provides output signals to all of the microactuators 158 (microactuator 0—microactuator N, also represented by designation numerals 159 and 161) coupled to actuator assembly 118. The inputs to DSP 190 also thus include head position signals 171 from the relevant heads, as well as relative position signals 179 of each of the heads with respect to VCM 173. Each of the microactuators is shown coupled to a head 181. Also, each of the microactuators has an associated relative position sensor 183 which senses the relative position of the microactuator, relative to the voice coil motor (or actuator assembly 118). The relative position sensor 183 can include any suitable sensor, such as a capacitive sensor or any other suitable type of position sensor. Thus, it can be seen that DSP 190 provides the coarse positioning signal to voice coil motor 173 for positioning the entire actuator assembly 118. DSP 190 also provides the fine positioning signals to microactuators 158.

In the preferred embodiment, DSP 190 not only takes into account the head position and relative position associated with each head, but also takes into account movement of adjacent or proximate heads (i.e., it takes into account cross-coupling of the heads) when providing the microactuator output for each microactuator associated with each head. In this way, DSP 190 accounts for structural mode excitation when positioning each of the individual heads. Also, in the preferred embodiment, DSP 190 controls to provide disturbance rejection, to account for runout, to prevent excessive actuator current, and to provide noise immunity.

Figure 6:
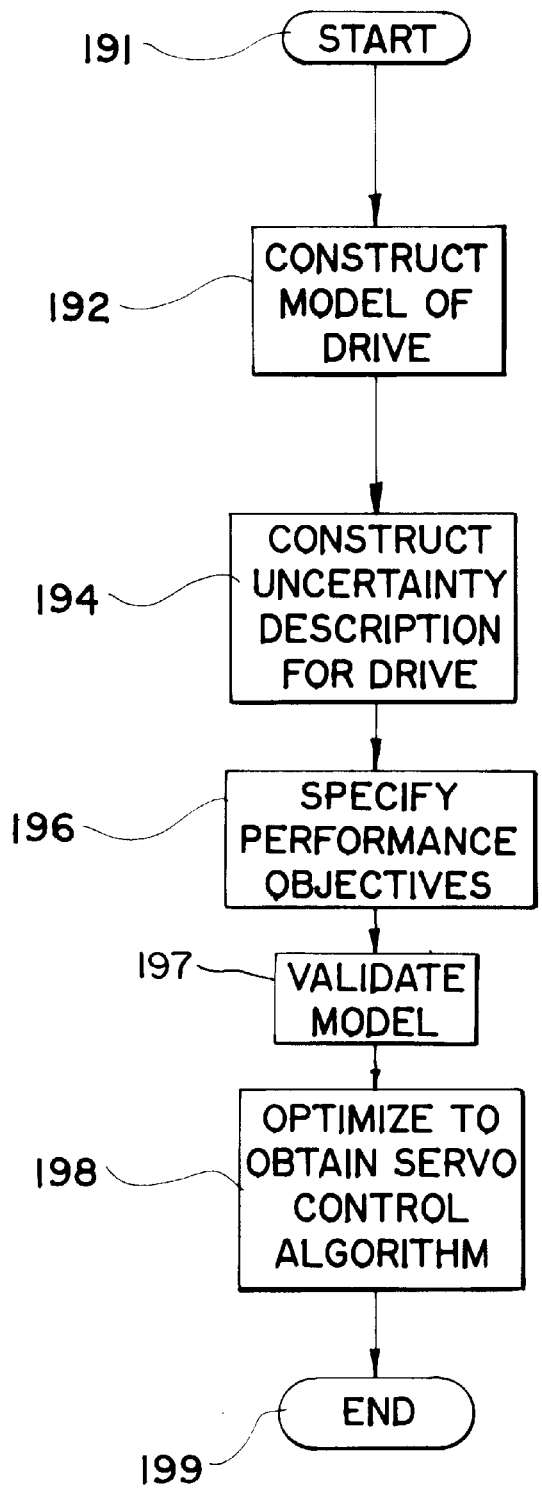
FIG. 6 is a flow diagram illustrating the construction of a servo control algorithm in accordance with one aspect of the present invention.

The DSP 190 illustrated in FIG. 5 preferably embodies a model-based algorithm. FIG. 6 (e.g., blocks 191–199) is a flow diagram illustrating one method in accordance with the present invention of developing the servo control system in which DSP 190 is implemented. Each block in FIG. 6 will be briefly discussed as an overview, and then each block will be discussed in greater detail.

A nominal model is first constructed which is primarily a set of differential equations that describe the structural dynamics of the disc drive. This is indicated by block 192 in FIG. 6. In constructing the nominal model, it is preferable that precise knowledge is known about the drive dynamics. This knowledge is preferably obtained using empirical/measured data. This type of information is used to define parameters in the system model, and all of this information is preferably used to construct a model from the first principles (or differential equations).

Next, an uncertainty description is constructed for the disc drive. This is illustrated by block 194 in FIG. 6. The uncertainty description is preferably designed to capture the drive behavior, along with variations, associated with a large number of drives. This data is used to modify the model constructed in block 192.

Performance objectives of the system are then specified. This is indicated by block 196 in FIG. 6. Such objectives are provided to ensure that the model is compatible with existing, and commercially available, tools to optimize and finalize development of the control algorithm which can be implemented in a variety of ways directly on the disc drive.

The model is then validated. This is indicated by block 197 in FIG. 6. In short, the model constructed to this point is a robust control model which is a model for a system which contains not only a model of the system dynamics, but an uncertainty and noise description as well. In general, the model validation problem is formulated as a linear time invariant system with norm-bounded structured uncertainty and experimental data. Model validation is performed by considering the model validation problem in the frequency domain. Techniques referred to as $\mu$-analysis and $\mu_g$-analysis are performed to determine whether the model is consistent with the data and whether the controller is consistent with the model.

Finally, the model is optimized using commercially available optimization software. Algorithms for computing $\mu$ and optimizing are available under the commercial designation MATLAB $\mu$-Analysis and Synthesis Toolbox. This is indicated by block 198 in FIG. 6.

A. The Actuator Model

Figure 7:
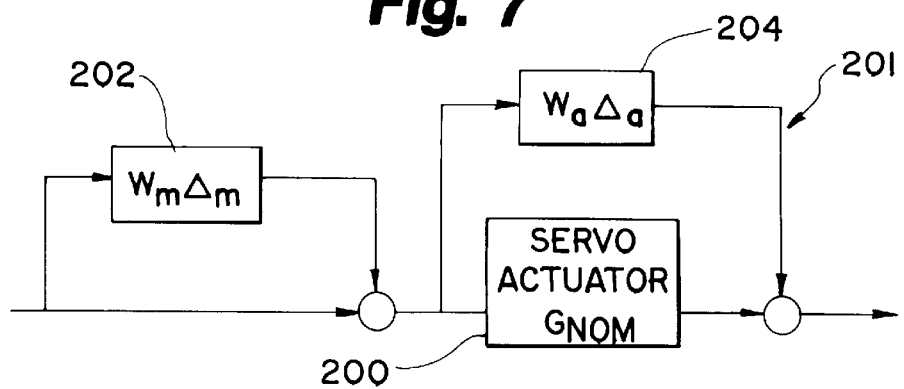
FIG. 7 is a block diagram of an actuator model in accordance with one aspect of the present invention.

FIG. 7 illustrates a model 201 of the servo actuator in accordance with one aspect of the present invention. FIG. 7 includes blocks 200, 202 and 204. Block 200 is representative of the servo actuator transfer function $G_{nom}$. Block 204 is representative of an additive uncertainty description, and block 202 is representative of a multiplicative uncertainty description.

1. The Nominal Model $G_{nom}$ is the actuator nominal model. The role of the nominal model is to accurately characterize the typical system dynamics. This means that the nominal model must be the average expected system behavior seen over the entire class of disc drives being modeled. In a preferred embodiment, the nominal model is developed by gaining a great deal of precise knowledge about the drive.

In one preferred embodiment, the nominal model is constructed in the frequency domain because worse case extremes on system dynamics may include many higher frequency structural modes which result in highly variable transient behavior in the time domain. Because the disc drive is open loop unstable, data is collected closed-loop. This is accomplished by injecting disturbances into the loop and measuring the input and output to the drive actuator. For example, in a preferred embodiment, frequency domain input and output information is collected using empirical tasks. Also, time domain responses to different types of inputs, such as pulse or step inputs is collected. This type of information is used to define parameters in the system model. Further, in a preferred embodiment, finite element analysis is undertaken to obtain structural data for various physical components in the system. All of this information is preferably used to construct a model from the first principles (or differential equations)

Figure 8:
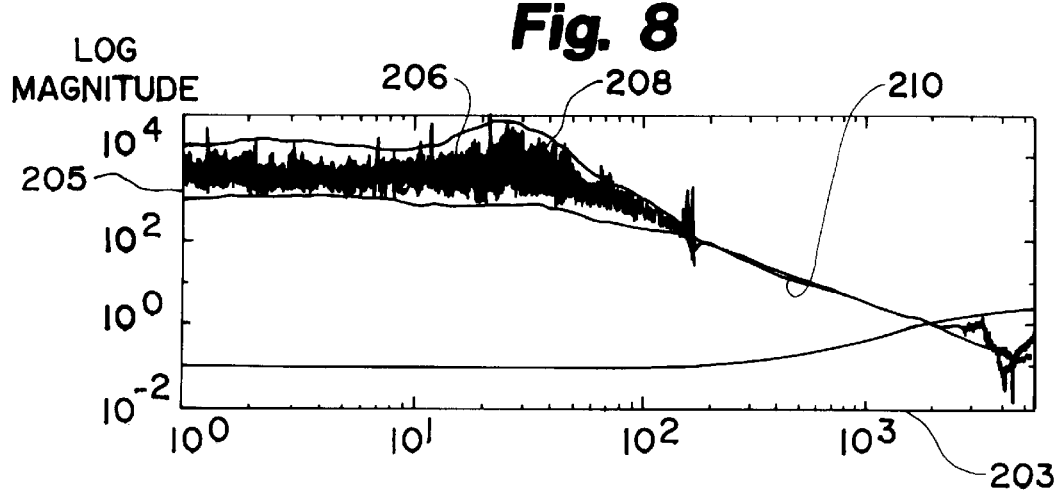
FIG. 8 is a graph illustrating a nominal model with measured data, and average measured data taken while injecting a position disturbance into the system.

FIG. 8 is a plot of frequency 203 versus log magnitude 205 which illustrates an open-loop transfer function obtained for a disc drive. Data was collected while performing a track following operation by injecting a sinusoidal position disturbance into measured head position and simultaneously measuring voice coil motor current and head position. Designation numeral 206 represents the nominal model of the disc drive. Designation numeral 208 represents measured data when tracking with the PID controller in the disc drive, and 210 is the average of the measured data. Data was collected at the inner, middle, and outer radius of the disc on heads 0, 1 and 3. Position disturbance amplitudes were 2% to 20% of track width.

The nominal model was chosen to be a cascade of second order systems given by:

$$y(s) = \frac{K_{DC}}{\frac{1}{\omega_n^2}s^2 + 2\frac{\xi}{\omega_n}s + 1} \prod_{i=1}^{n} \frac{\frac{1}{\omega_{n_{z,i}}^2}s^2 + 2\frac{\xi_{z,i}}{\omega_{n_{z,i}}}s + 1}{\frac{1}{\omega_{n_{p,i}}^2}s^2 + 2\frac{\xi_{p,i}}{\omega_{n_{p,i}}}s + 1} u(s) \quad \text{Equation 1}$$

where $K_{DC}$ is the actuator direct current (DC) gain, n is the number of resonant modes, for the $i^{th}$ resonant mode, i=1, ... n, $\xi_{z,i}$ and $\omega_{n_z}$ are the damping and natural frequency of the zeros and $\xi_{pi}$ and $\omega_{n_p}$ are the damping and natural frequency of the poles. Similarly, $\xi$ and $\omega_n$ define the low frequency behavior of the drive.

Also, in the nominal model described by Equation 1, delay can be modeled. There are various sources of delay in the disc drive. For example, the pulse width modulation (PWM) filter, the power amplifier, the voice coil time constants, and other sources, can all inject delay into the system. A standard procedure for modeling pure delay in continuous-time is to use a Padé approximation as follows:

$$\mathcal{L}\{x(t-t_d)\} \approx \frac{2+\sum_{i=0}^{n}\frac{(-t_d s)^i}{i!}}{2+\sum_{i=0}^{n}\frac{(t_d s)^i}{i!}} \quad \text{Equation 2}$$

where $t_d$ is the delay in seconds, s is the frequency parameter, and $\mathcal{L}\{.\}$ is indicative of the Laplace transform of the argument.

In order to model time delay, generally low order Pade approximations are adequate (e.g., first or second order). Other robust approximations are also available.

2. The Uncertainty Description

The uncertainty description designated by blocks 202 and 204 in FIG. 7 are used because an exact mathematical model of the actuator system in the disc drive is not possible. An exact model means that the system can be represented by a set of differential equations, where all parameters of the differential equations are known. Under normal circumstances, it is not possible to exactly model a disc drive. However, it is possible to define a set of models which "covers" the behavior of the disc drive. Uncertainty modeling is one way to define such a set.

In a typical disc drive, the disc drive structure itself has resonant modes at higher frequencies. Further, the natural frequency and damping of the low frequency mode is somewhat amplitude dependent. In other words, it is defined by some non-linear dynamic, most likely resulting from bearing hysteresis, flex circuit bias forces, etc. These variations are most effectively captured in the uncertainty description.

Block 204 illustrates the augmentation of the nominal model designated by block 200 with additive uncertainty. Additive uncertainty describes the following set of systems:

$$g: G(S)=G_{nom}(S)+W_a(S)\Delta(S), \|\Delta\|<1 \quad \text{Equation 3}$$

where $\Delta(S)$ is a norm-bounded uncertainty perturbation and $W_a(S)$ is a frequency domain weighting function. The uncertainty perturbation $\Delta(S)$ is norm-bounded so the weighting function is used, in general, to specify any frequency dependency on the size of the uncertainty. Additive uncertainty is typically used to characterize dynamic uncertainty. Therefore, uncertainty perturbation $\Delta(S)$ will generally be thought of as a complex full matrix at each frequency.

Additive uncertainty is typically most effectively used to model high frequency dynamic uncertainty, such as the resonant modes in the disc drive. For example, there is little or no reliable information about the dynamics of the disc drive available in a frequency range greater than approximately 2 kHz. That is primarily because the natural frequency and damping of these structural modes vary from system to system.

The role of the additive uncertainty weight $w_a$ is to introduce a floor on the system gain at high frequencies.

FIGS. 9-1 and 9-2 show a plot of frequency 209 versus magnitude 211 and illustrate the use of additive uncertainty. In FIG. 9-1, a nominal model is designated 212, and actual measured values are indicated by 214. Additive uncertainty which is used to account for the unmodeled dynamics provides an envelope indicated by 216. FIG. 9-2 illustrates one embodiment of the additive uncertainty weight function 218.

Multiplicative uncertainty describes the following set of systems:

$$g: G(S)=G_{nom}(I+W_m(S)\Delta(S)), \|\Delta\|<1 \quad \text{Equation 4}$$

where $\Delta(S)$ is a norm-bounded uncertainty perturbation, and $W_m(S)$ is the frequency-domain weighting function. As with additive uncertainty, $\Delta(S)$ is generally thought of as a complex full matrix at each frequency.

Multiplicative uncertainty is effective at modeling low frequency gain variation. FIG. 9-3 illustrates using multiplicative uncertainty to account for gain variation. FIG. 9-3 is similar to FIG. 9-1, and similar items are similarly numbered. However, 216 illustrates an envelope for a set of systems with multiplicative uncertainty at lower frequencies. The role of the multiplicative uncertainty weight $W_m$ is to provide an envelope around the nominal transfer function. The envelope, in many cases, will be approximately plus or minus 50% up to about 100 hertz, after which it tapers off to less than 1%. FIG. 9-4 illustrates the multiplicative uncertainty weight function 218 for the uncertainty 216 shown in FIG. 9-3.

Given the model shown in FIG. 7, the role of the designer is to select uncertainty weights $W_m$ and $W_a$ which adequately cover data collected from the disc drive without being overly conservative. Some simple estimations are given in FIGS. 10-1 through 10-3 which plot frequency 215 versus magnitude 217 and phase error 219.

Figures 1, 10:
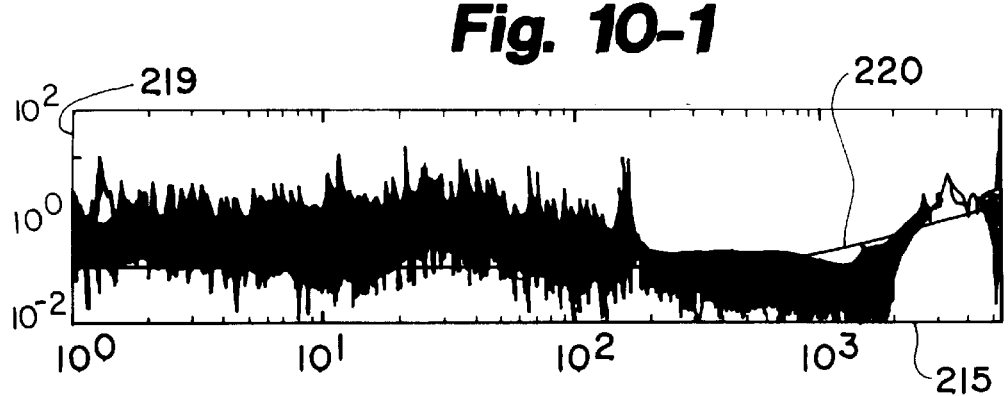
Figures 2, 10:
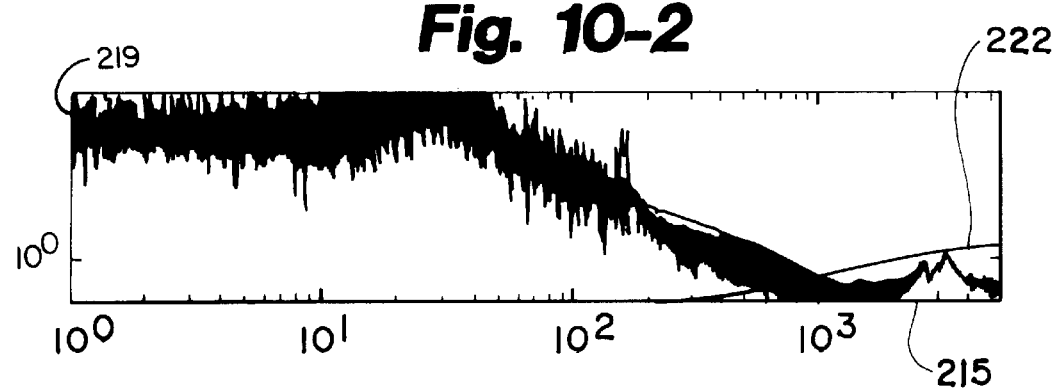
Figures 3, 10:
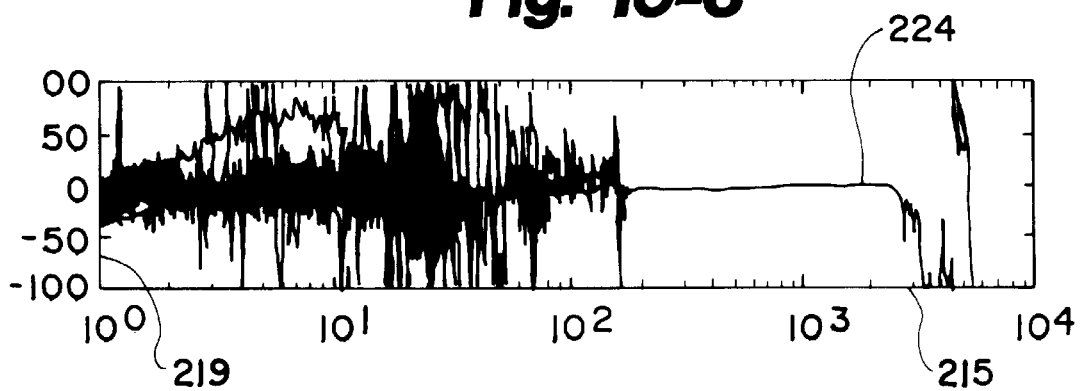

Examples of additive and multiplicative uncertainty levels in a typical disc drive are illustrated in FIGS. 10-1, 10-2 and 10-3. FIG. 10-1 illustrates the estimated multiplicative uncertainty 220. FIG. 10-2 illustrates estimated additive uncertainty 222 and FIG. 10-3 shows phase error 224 as a function of frequency (used for delay estimation). Note that additive and multiplicative uncertainty can both be used for low, mid, and high frequency uncertainty models. The designs chooses the uncertainty model to simplify weights. Further, a plurality of additive and multiplicative uncertainty may be used.

B. $H_\infty$ and $\mu$-Synthesis Controller Design

Figure 12:
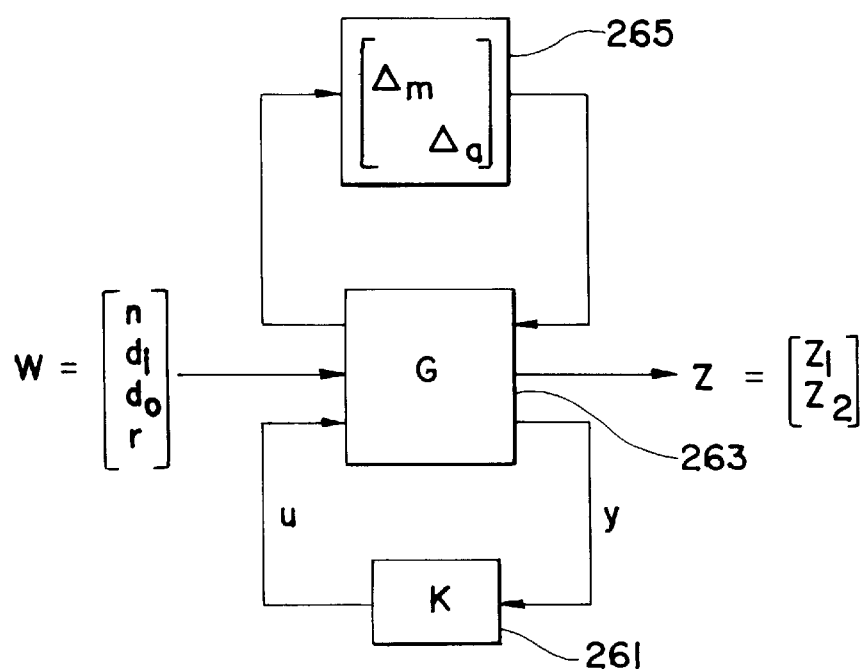
FIG. 12 is a block diagram illustrating the linear fractional transformation (LFT) of the track following control synthesis interconnection shown in FIG. 11.

Once the actuator model 201 shown in FIG. 7 has been obtained, the next step is to specify performance objectives and design an optimized controller for controlling the modeled actuator. FIG. 12 illustrates a block diagram of a track following control synthesis interconnection 230 illustrative of a disc drive. Note that system 230 includes actuator model 201. Controllers are designed to optimize the weighted interconnection 230.

Figure 11:
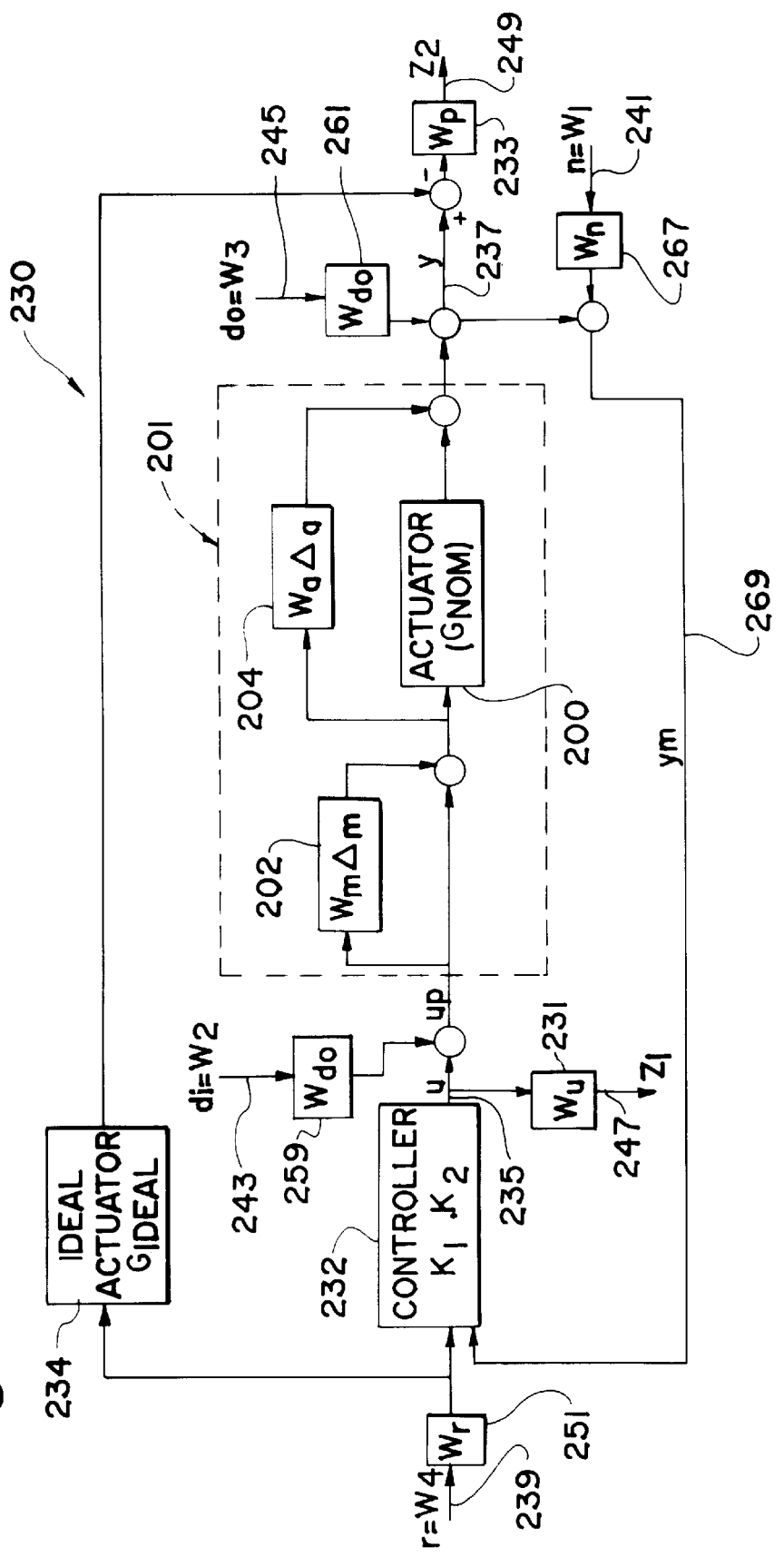
FIG. 11 is a block diagram illustrating a track following control synthesis interconnection in accordance with one aspect of the present invention.

In FIG. 11, the system blocks preferably include controller block 232, actuator model 201, ideal actuator model 234, synthesis weights 231 ($W_u$) and 233 ($W_p$) which are placed on the current and tracking error signals 235 (u) and 237 (y), respectively, exogenous inputs including commanded offset position 239 (r), position sensor noise 241 (n), signal 269 ($y_m$), weight 267 ($w_n$), current disturbance 243 ($d_i$), input weight 259 ($w_{d1}$), output weight 261 ($w_{d0}$) and position disturbance 245 ($d_0$), and controlled outputs 247 (z1) and 249 (z2) corresponding to current penalty and tracking error, respectively.

In the preferred embodiment, controller block 232 is preferably provided in a two-degree-of-freedom control configuration including compensator $K_2$ and precompensator $K_1$. Precompensator $K_1$ is included to improve the transient response of the closed loop system.

The interconnection shown in FIG. 11 is preferably designed to satisfy the following equations, which describe actuator current penalty and tracking error.

$$z_1 = W_u \frac{K_1}{1 - GK_2} W_r r + W_u \frac{GK_2}{1 - GK_2} W_{d_i} d_i +$$
$$W_u \frac{K_2}{1 - GK_2} W_{d_0} d_0 + W_u \frac{K_2}{1 - GK_2} W_n n \quad \text{Equation 5}$$

$$z_2 = W_p \left( \frac{GK_1}{1 - GK_2} - G_{ideal} \right) W_r r + W_p \frac{G}{1 - GK_2} W_{d_i} d_i +$$
$$W_p \frac{1}{1 - GK_2} W_{d_0} d_0 + W_p \frac{GK_2}{1 - GK_2} W_n n \quad \text{Equation 6}$$

The interconnection shown in FIG. 11 can be simplified to an equivalent linear fractional transformation shown in FIG. 12, which includes controller 261, actuator 263, and uncertainty 265. Linear fractional transformations (LFTs) are frequently used in modern control theory to simplify notation for interconnections of linear systems, and can be thought of as a mathematical representation of a block diagram consisting of linear blocks with feedback.

From the LFT shown in FIG. 12, the resulting $H_{2\delta}$ optimization criterion is as follows:

$$K = \arg \min \|F_L(F_U(\Delta, G), K)\|_\infty \text{ where,} \quad \text{Equation 7}$$

$$\Delta = \begin{pmatrix} \Delta_m & 0 \\ 0 & \Delta_a \end{pmatrix}$$

$$\Delta_m, \Delta_a \in C$$

$$\|\Delta\|_\infty \leq 1$$

where $F_1$ ($F_u(\Delta, G)$, K) illustrates the feedback interconnection w→z;

where $\|.\|_\infty$ illustrates the induced ∞-norm of the argument; and where C is the set of complex numbers.

For robust performance, a closed loop system shall have a controller, K, which stabilizes the set of plants:

$$\{P : P = F_u(\Delta, G), \forall \Delta \in \beta \Delta\}, \quad \text{Equation 8}$$

where $$\beta \Delta_1 = \{\Delta \in \Delta_1 : \|\Delta\|_\infty \leq 1\}$$

And further satisfies the performance objective:

$$\|F_1(F_u(\Delta, G), K)\|_\infty < 1 \forall \Delta \beta \Delta, \quad \text{Equation 9}$$

Therefore, from Equations 5, 6 and 7, the following norm inequality can be derived:

$$\|\omega_j \to Z_i\|_\infty \leq \|\omega \to Z\|_\infty, \forall i, j \quad \text{Equation 10}$$

where $\|w \to z\|_\infty = \|F_1(F_u(\Delta, G), K)\|_\infty$ and $w_j \to z_i$ is the transfer function from $w_j$ to $Z_i$.

Therefore, if controller K is designed to satisfy $\|\omega \to Z\|_\infty < \gamma$ then, from the $H_\infty$ optimization criterion set out in Equation 7, and from the norm inequality set out in Equation 10, the following performance inequalities hold at each frequency ω.

$$\left| \frac{GK_1}{1 - GK_2}(jw) - G_{ideal}(jw) \right| < (|W_p(jw)||W_r(jw)|)^{-1} \gamma \quad \text{Equation 11}$$

$$\left| \frac{G}{1 - GK_2}(jw) \right| < (|W_p(jw)||W_{d_i}(jw)|)^{-1} \gamma \quad \text{Equation 12}$$

$$\left| \frac{1}{1 - GK_2}(jw) \right| < (|W_p(jw)||W_{d_0}(jw)|)^{-1} \gamma \quad \text{Equation 13}$$

$$\left| \frac{GK_2}{1 - GK_2}(jw) \right| < (|W_p(jw)||W_n(jw)|)^{-1} \gamma \quad \text{Equation 14}$$

In addition, the following actuator penalty inequalities (actuator inequalities also hold:

$$\left| \frac{K_1}{1 - GK_2}(jw) \right| < (|W_u(jw)||W_r(jw)|)^{-1} \gamma \quad \text{Equation 15}$$

$$\left| \frac{GK_2}{1 - CK_2}(jw) \right| < (|W_u(jw)||W_{d_i}(jw)|)^{-1} \gamma \quad \text{Equation 16}$$

$$\left| \frac{K_2}{1 - GK_2}(jw) \right| < (|W_u(jw)||W_{d_0}(jw)|)^{-1} \gamma \quad \text{Equation 17}$$

$$\left| \frac{K_2}{1 - GK_2}(jw) \right| < (|W_u(jw)||W_n(jw)|)^{-1} \gamma \quad \text{Equation 18}$$

It can be seen that the performance inequalities set out in Equations 11–14 act as a set of performance constraints on the system. Equation 11 defines a tracking constraint, Equation 12 defines an input disturbance rejection (rotational vibration) constraint, Equation 13 defines a position disturbance rejection constraint which includes current disturbance rejection, written-in error rejection, repeatable runout rejection, non-repeatable runout rejection, and bias current errors, and Equation 14 is a noise rejection constraint.

The tracking constraint set out in equation 11 is placed on the system so that by selecting weights 233 ($w_p$) and 251 ($w_r$), the designer can force the controller to meet any desired response, if possible. For example, the designer may wish to have the step response of the actuator to have a certain appearance in the frequency domain (e.g., when moving a track, or executing a read-to-write offset). Typically, the weights will be chosen such that the tracking constraint is heavily damped. Ringing can excite structural modes in the drive, and heavy damping tends to avoid this problem. It should be noted that by providing controller K as a two-degree-of-freedom controller, the present system provides an extra degree of freedom to further enable implementation of the tracking constraint. Also, the transfer function $G_{ideal}$ in Equation 11 is preferably designed to provide the ideal response to command offsets. Then, the performance objective given by Equation 11 forces the disc drive response to match the response of $G_{ideal}$. This type of tracking objective is referred to as explicit model following. There are also implicit techniques which do not require embedding a model in the synthesis interconnection, which avoids the additional states. However, explicit techniques are preferred since they are often simpler to design.

The input and output disturbance rejection performance constraints set out in Equations 12 and 13 enable the track following servo system to reject disturbances from exogenous sources, and to therefore maintain tight tracking performance under these normal operating conditions. For example, a seek arrival results in actuator position and velocity error at the time the tracking controller is switched on. In addition, user configuration subjects the disc drive to translational and rotational shock and vibration. Good tracking performance thus requires the servo system to respond quickly and attenuate both persistent and step or impulsive bias current, torque, position and velocity disturbances. Furthermore, excessively high amplitude or long time constant ringing is generally highly undesirable in such systems. These requirements are captured well by norm-constraints on specific transfer functions. The effect of bias current and torque disturbances can be minimized through attenuation of the norm-constraint set out as follows:

$$\left| \frac{G}{1 - GK_2}(jw) \right| \le \|d_i \to z_2\|_\infty \quad \text{Equation 19}$$

in some proscribed frequency range.

Fast response results from more attenuation from DC to a critical frequency. Ringing results from peaking in the transfer function.

Similarly, position disturbances are minimized by attenuating:

$$\left| \frac{1}{1 - GK_2}(jw) \right| \le \|d_0 \to z_2\|_\infty \quad \text{Equation 20}$$

The attenuation Equations 19 and 20 can be obtained by setting the performance weights in Equations 12 and 13.

While the system is not able to filter or reject sensor noise, it is preferably designed so that noise is not exacerbated. This might occur if there was peaking in the transfer function set out in Equation 14. The term peaking generally denotes gains of 0 dB or higher in some frequency range. Peaking is generally used to refer to unwanted amplification in a closed-loop transfer function. It should be noted that where there is large gain, this transfer function is nearly unity. Thus, if there is excessive noise at those frequencies at which the controller is expected to have high performance, it is generally desirable to incorporate a noise filter using a priori information about the noise spectrum. In disc drives, this is often accomplished by utilizing a repeatable runout compensator which locks in on repeatable noise caused by written-in error resulting from the servo track writing system.

The actuator constraints set out in Equations 15–18 include a tracking constraint (Equation 15), an input disturbance constraint (Equation 16), an output disturbance constraint (Equation 17) and a noise constraint (Equation 18).

The role of the designer is to select the frequency weights $w_p$, $w_u$, $W_r$, $W_{d_i}$, $w_{d_0}$, and $w_n$ which capture performance requirements for the disc drive. If the performance requirements are easily expressed in the frequency domain, then weight selection is simple. Generally, however, there will be time-domain requirements as well. For example, such requirements may include overshoot, rise times, settle times, and ringing, which must be converted to equivalent properties in the frequency domain (e.g., bandwidth, attenuation, peaking, etc.).

The actuator constraints (or objectives) set out in Equations 15–18 penalize the actuator control signal. This preferably serves several roles. For systems with little or no uncertainty, these objectives can force the controller to roll off, hence limiting bandwidth. Normally, however, these objectives are used to limit the magnitude of the control signal, minimizing the possibility of control signal saturation in the servo actuator.

Tuning the associated weights is an iterative process, using data from simulation and tests to determine appropriate weights.

C. Robustness and Model Validation and Optimization

Once the model has been developed and appropriate weights have been selected, the robustness of the model is validated. In the preferred embodiment, this is accomplished using $H_\infty$ and $\mu$ synthesis techniques. A matrix function $\mu$ can be calculated and used to analyze the stability and performance properties of the interconnection structure set out in FIG. 12 which includes controller 261, actuator 263 and uncertainty 265. $\mu$ analysis is used for analyzing the stability and performance properties of interconnected systems subject to norm-bounded structured uncertainty.

FIG. 12 gives the general interconnection with structured uncertainty which is appropriate for $\mu$ analysis and $\mu$ synthesis.

After the matrix function $\mu$ is calculated for the system, the function $\mu_g$ is calculated. $\mu_g$ is an extension of the $\mu$ framework where perturbation blocks are divided into two sets, one satisfying maximum norm constraints (similar to $\mu$) and the other satisfying minimum norm constraints. It will be seen that such a formulation solves a model validation problem. Computable lower and upper bounds for $\mu_g$ are generally known.

In essence, after synthesizing a controller, $\mu$ defines the maximum sizes of disturbances, noises, and model uncertainty for which the closed-loop system preserves stability and performance. For a given set of data, model validation $\mu_g$-analysis defines the minimum sizes of disturbances, noises, and model uncertainty necessary for the model to fit the data. The closed-loop system is robust if the controller is capable of preserving stability and performance on the actual system. Simply put, if $\mu(\omega)$ is less than $\mu_g(\omega) \forall \omega \in \Omega$ then the model is consistent with the data, and the controller is consistent with the model. Therefore, the closed loop system is robust over the frequency set $\Omega$.

Figure 13:
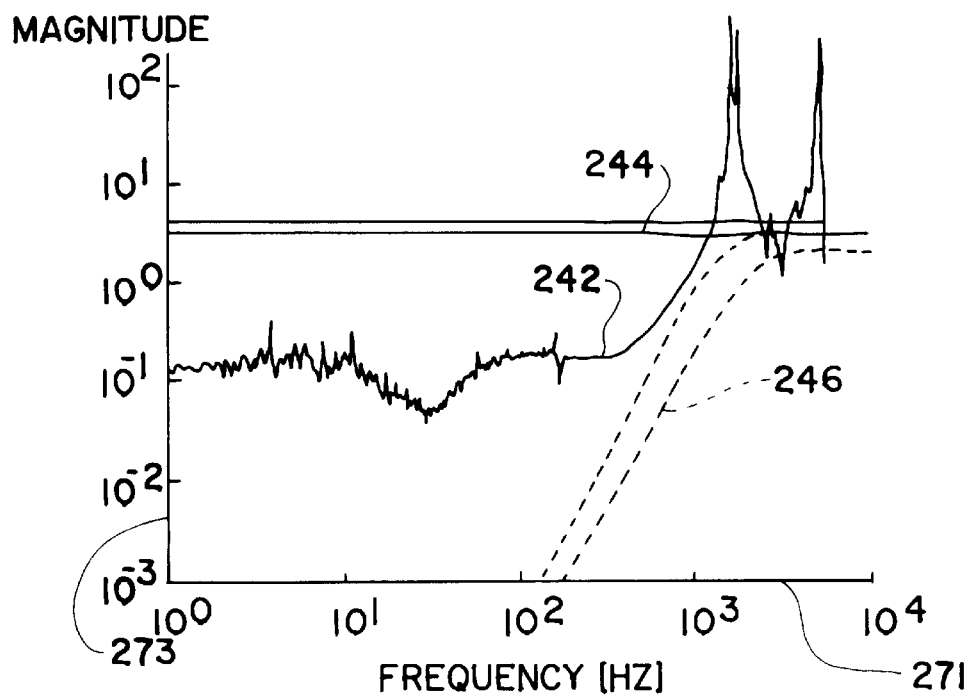
FIG. 13 is a graph illustrating a model validation in accordance with one aspect of the present invention.

FIG. 13 is a graph of frequency 271 versus magnitude 273, showing stability and performance robustness for a closed-loop tracking controller. The $\mu_g$ function is designated by 242. $\mu(\omega)$ for performance objectives is designated 244, and $\mu(\omega)$ for stability is designated by 246. At each frequency, the closed-loop system is robustly stable if $\mu$ is less than $\mu_g$. The critical frequency range in a disc drive occurs where the structural modes are uncertain (that is, above approximately 1–2 kHz). Thus, it can be seen from FIG. 13 that the closed-loop system may lose stability in the frequency range from 2 kHz to 4 kHz. There are some frequencies in that range at which $\mu_g$ drops below $\mu(\omega)$ for both stability and performance analysis.

By iterating on the uncertainty and performance weights, stability robustness can be improved. This requires either increasing the uncertainty level or reducing the desired performance level (or both). Each iteration requires the $\mu$ robustness analysis to be recalculated and the uncertainty and performance weights to be tuned appropriately.

Tuning the controller in accordance with the present invention is preferably conducted in two stages. The first stage is simulation, and the second stage is implementation. In both stages, open and closed-loop data is used to evaluate the effectiveness of the control design. Based on this data, the nominal model, uncertainty weights, or control performance weights, or all of the above, are adjusted.

One simple tuning technique is to adjust the frequency weight $w_p$ in the performance constraints set out in Equations 11–14. This will directly affect all of the relevant performance objectives. In this way, the bandwidth of the controller can be easily adjusted by multiplying $w_p$ by a scalar, without resorting to the more complex process of adjusting each of the other frequency weights in the performance constraints set out in Equations 11–14.

This type of tuning can be advantageously employed when initializing a new servo controller on a new disc drive product. The weights from the previous generation design can be used, with a scaling of $w_p$ to reduce the bandwidth on the new disc drive product until design specific weighting is complete. This can potentially lend itself to initializing a new product more quickly.

In addition, one parameter can advantageously be tuned on-line—the loop gain of the servo controller. In fact, the loop gain can preferably even be tuned on a per drive basis. For example, by scaling the servo controller, the loop gain can be increased or decreased resulting in an increase or decreases in closed-loop bandwidth.

Figure 14:
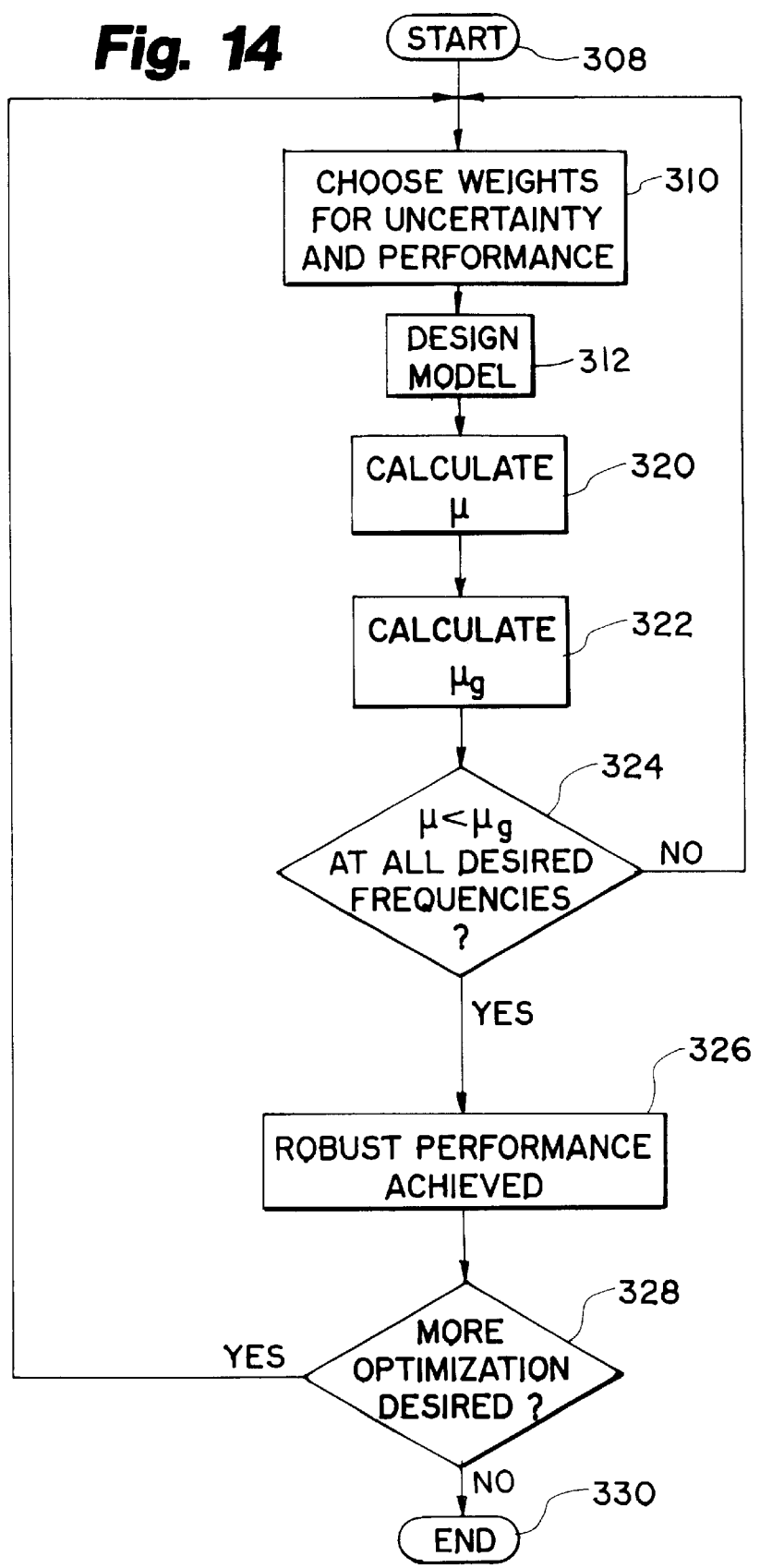
FIG. 14 is a flow diagram illustrating a model validation technique in accordance with one aspect of the present invention.

FIG. 14 is a flow diagram including blocks 308–330 illustrating the above-described process by which the disc drive model is validated and optimized. First, all of the weights for the uncertainty description and the performance constraints are chosen by the designer in order to design a model. These items may, of course, be chosen intuitively, or through experimentation. This is indicated by blocks 310 and 312.

Next, the matrix function $\mu(\omega)$ is calculated for conducting $\mu$ analysis on both stability and performance. This is indicated by block 320. The function $\mu(\omega)$ can be calculated (or the upper and lower bounds of that function can be calculated) using the techniques described above, or any other known techniques.

$\mu_g(\omega)$ is then calculated using the weights chosen in block 310. This is indicated by block 322. As mentioned above, once $\mu(\omega)$ and $\mu_g(\omega)$ are calculated, two things are known. First, the minimum uncertainty required by the model for the model to fit the data (or be consistent with the data) is known from $\mu_g$. Also, the maximum amount of uncertainty which the controller can tolerate and still maintain stability and to meet the performance constraints is also known (from $\mu$).

Thus, the next step is to compare $\mu$ with $\mu_g$ to ensure that $\mu$ is less than $\mu_g$ at all desired frequencies. If this is not true, then there are some frequencies in the subject frequency range at which the controller will not achieve robust performance. In other words, there are some frequencies at which the controller will be destabilized, or will not meet the performance constraints, or both. In that case, processing reverts to block 310 in which new weighting functions are chosen. This is indicated by block 324. $\mu(\omega)$ for performance and stability analysis is then recalculated, as is $\mu_g$, with the new weighting functions. This is indicated by blocks 310–322.

However, if at block 324, it is determined that $\mu$ is less than $\mu_g$ at all desired frequencies, then robust performance will be achieved by the controller obtained when using the weighting functions chosen at block 310. This is indicated by block 326.

It is next determined whether more optimization of the model is desired. If so, processing reverts to block 310 where new weighting functions are again chosen. In order to optimize the system, the weighting functions can be adjusted to provide better performance, or less uncertainty, or both. $\mu$ and $\mu_g$ are calculated using those new values to determine whether the controller will still provide robust performance. This can be repeated until optimization has reached a desired level. In other words, this can be repeated until the amount of conservatism in the model has been reduced to obtain a desired performance level, while still maintaining a controller which provides robust performance in the subject frequency range. Once this has occurred, and no more optimization is desired, the model has been validated and the controller has been optimized to a desired point, and the design is substantially complete such that the controller can be implemented. This is indicated by blocks 328 and 330.

D. Implementation of the Controller In a Digital Signal Processor (DSP)

After obtaining the transfer function for the controller as described above, the frequency domain transfer function has discrete time state-space realizations as follows:

$$x(k+1) = Ax(k) + Bu(k) \qquad \text{Equation 21}$$

$$y(k) = Cx(k) + Du(k)$$

where
$X \in R^n$ is a controller state;
$u \in R^m$ is a controller input (e.g., derived from the position error signal (PES));
$y \in R^p$ is a controller output (e.g., an output to the voice coil motor and/or a microactuator);
A, B, C, D are matrices of suitable dimension; and
$R^n$, $R^m$ and $R^p$ are n-dimensional, m-dimensional, and p-dimensional vectors of real numbers, respectively.

However, implementation of this discrete-time-system onto a digital signal processor can present problems. As described in the background portion of the application, those problems generally relate to dealing with intermediate calculations which overflow the register capacity, the general computational power and memory capacity of conventional digital signal processors, the conversion of the discrete-time system to a fixed-point processor, and the reduction or elimination of quantization errors in the controller.

Figure 15:
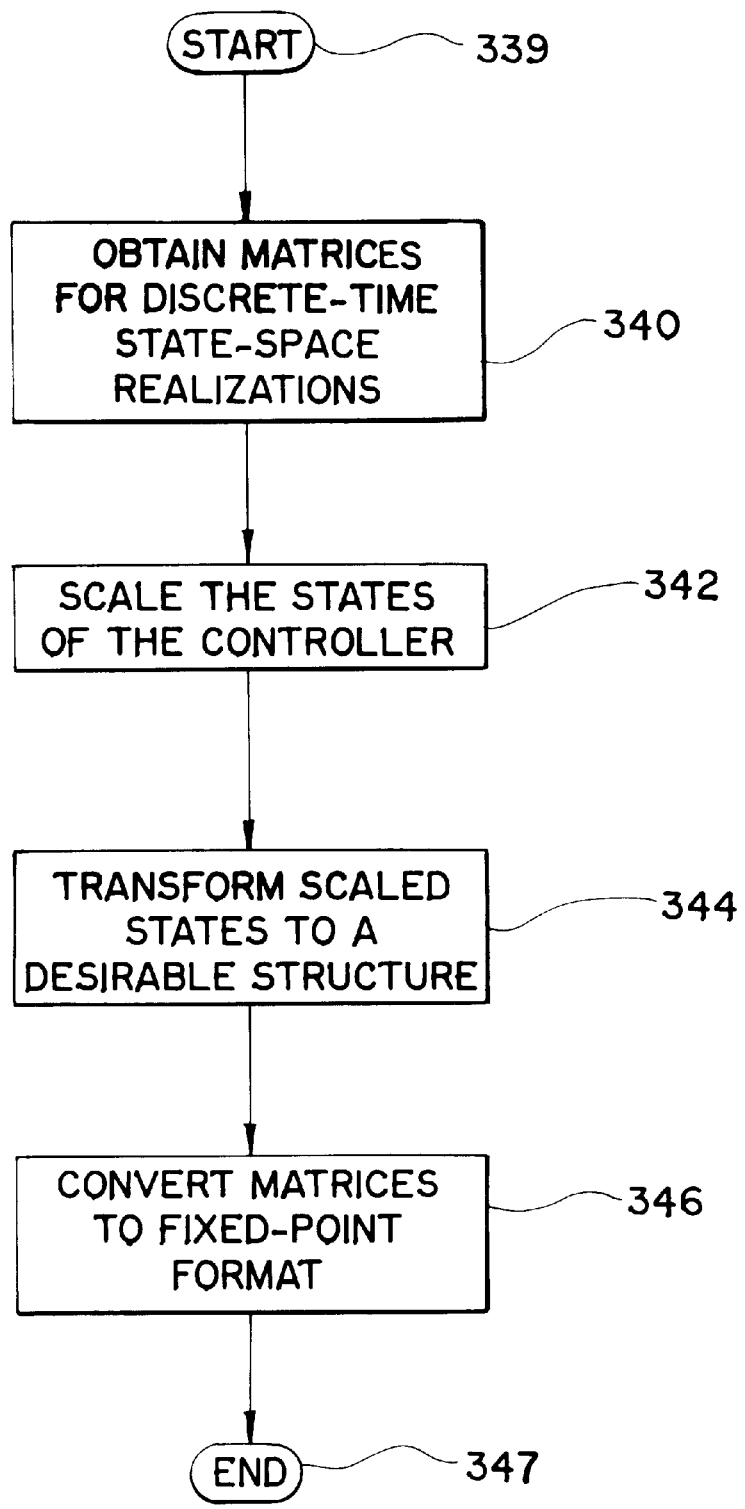
FIG. 15 is a flow diagram illustrating the implementation of a servo controller and a digital signal processor in accordance with one aspect of the present invention.

FIG. 15 is a flow diagram including blocks 339–349, illustrating one preferred technique for implementing the controller on a digital signal processor in accordance with one aspect of the present invention. Each of the blocks in FIG. 15 will be discussed briefly, and then each block will be discussed in more detail later in the application. First, as described above, the matrices for the discrete time state-space realizations set out in Equation 21 are obtained. This is indicated by 340.

The states of the controller are then scaled. In one preferred embodiment, under worst case assumptions, the bound of the controller states are determined and a state transformation is undertaken to scale the bound to a desired level. This significantly reduces the possibility of overflow during the intermediate controller calculations. This is indicated by block 342.

The states of the controller are then transformed into a more desirable structure. In one preferred embodiment, the states of the controller are transformed into a bi-diagonal structure which significantly reduces computation time and the memory requirements of the digital signal processor. This is indicated by block 344.

Finally, the matrices are converted such that the controller parameters are shifted from a floating-point format to a fixed-point format. In doing this, care is taken to significantly reduce the quantization errors incurred to an acceptable level. In one preferred embodiment, the matrices are shifted to fractional binary number format, locating the point in the fractional binary number representation at a desired location. This is indicated by block 346.

1. Scaling the States of the Controller to Reduce Overflow

The state evolution for the discrete-time realization set out in Equation 21 is given by:

$$x(k) = A^k x(o) + \sum_{v=0}^{k-1} A^{k-1-v} Bu(v) \qquad \text{Equation 22}$$

where x(0) is the initial condition.

The present invention minimizes, or at least reduces, the possibility of encountering overflow in the intermediate controller calculations. In the preferred embodiment, this is done by automatically scaling the states of the controller. Thus, at each sample k, it can be assumed (without loss of generality) that for each input $u_i$:

$$|u_i(k)| \leq M_i, M_i > 0, i=1\ldots m, \qquad \text{Equation 23}$$

where m is defined as the number of inputs to the controller. Then, under the worst case assumptions, the $k^{th}$ sample of that state in the controller satisfies the following bound:

$$|x(k)| = \qquad \text{Equation 24}$$

$$\left| A^k x(0) + \sum_{v=0}^{k-1} A^{k-1-v} Bu(v) \right| \leq |A^k x(0)| + \left| \sum_{v=0}^{k-1} A^{k-1-v} Bu(v) \right| \leq$$

$$|A^k||x(0)| + \left( \sum_{v=0}^{k-1} |A^{k-1-v}| \right) |B|[M_1 M_2 \ldots M_m]^T$$

where m and $M_j$ are defined as set out in Equation 23.

For a stable system (i.e., $\rho(A)<1$), there exists some integer, N, such that $A^N$ becomes diminishingly small. Then, from Equation 24, the state described by Equation 24 satisfies the following bound:

$$\max_{k \to \infty} |x(k)| \leq \left( \sum_{v=0}^{N-1} |A^{N-1-v}| \right) |B|[M_1 M_2 \ldots M_m]^T \qquad \text{Equation 25}$$

The bound on the controller states given in Equation 25 (recalling that it is the bound on the worst case sample) can be used to form a state transformation.

First, let T be defined as follows:

$$T = \text{diag}\left( \sum_{v=0}^{N-1} |A^{N-1-v}| \right) |B|[M_1 M_2 \ldots M_m]^T \qquad \text{Equation 26}$$

where diag (.) is defined as the diagonal matrix whose main diagonal is the vector identified by the argument (.). Then, the state transformation z=T(x) will satisfy the bounds $$\max_{k \to \infty} |Z(k)| \leq 1 \qquad \text{Equation 27}$$

Thus, the new controller realization is as follows:

$$z(k+1) = TAT^{-1}z(k) + TBu(k) \qquad \text{Equation 28}$$

$$y(k) = CT^{-1}z(k) + Du(k)$$

It should be noted that a controller which implements pure integrators cannot be stable since $\rho(A) = 1$. In that case, there is no integer, N, such that $A^N$ approaches 0. However, in many cases (and in particular in $H_\infty$ and $\mu$-synthesis), the controller will not have pure integrators, but may have a spectral radius near unity. Thus, there will be an integer, N, such that $A^N$ approaches 0. Yet the integer N may be very large. This implies that the state transformation set out in Equation 26 will result in extremely conservative bounds for all but the integrating states. Therefore, in the cases where the spectral radius of the controller is nearly unity, a suitable anti-integrator windup technique is also implemented in order to further reduce the likelihood of integrator overflow, with the remaining controller states being bounded as described above.

2. Transforming the Scaled States to Reduce the Need for Computational Power and Memory Capacity in the DSP The discrete-time system set out in Equation 21 can have arbitrary elements in the matrices A, B, C and D. Thus, at each sample, this could require up to (n+p)×(m+m) multiplications, and (n+p)×(n+m−1) additions. This is highly undesirable because it would require an impractically large number of mathematical operations (multiplications and additions) to be executed by the controller. However, using state transformations, the number of multiplications and additions can be dramatically reduced.

In the embodiment in which the controller is implemented as a single input/single output (SISO) controller, canonical forms can be employed to obtain dramatic computational simplification. In such an embodiment, a preferred controller canonical form for the controller realization set out in Equation 21 is as follows:

$$z(k+1) = A_c z(k) + b_c u(k) \qquad \text{Equation 29}$$

$$y(k) = c_c z(k) + du(k)$$

where $C_c$ and d are arbitrary matrices; and $A_c$ and $b_c$ are defined as follows:

$$A_c = \begin{bmatrix} -a_1 & -a_2 & -a_3 & -a_4 & -a_5 & \ldots & \ldots & \ldots & \ldots & a_n \\ 1 & 0 & \ldots & \ldots & \ldots & \ldots & \ldots & \ldots & \ldots & 0 \\ 0 & 1 & 0 & \ldots & \ldots & \ldots & \ldots & \ldots & \ldots & 0 \\ \ldots & \ldots & \ldots & \ldots & \ldots & \ldots & \ldots & \ldots & \ldots & \ldots \\ 0 & \ldots & \ldots & \ldots & \ldots & \ldots & 0 & 1 & 0 & 0 \\ 0 & \ldots & \ldots & \ldots & \ldots & \ldots & \ldots & 0 & 1 & 0 \end{bmatrix} \qquad \text{Equation 30}$$

$$b_c = \begin{bmatrix} 1 \\ 0 \\ 0 \\ 0 \\ \ldots \\ 0 \\ 0 \end{bmatrix} \quad \text{Equation 31}$$

where n is the number of states in the controller; and $a_i$ are coefficients of the $s^{n-i}$ term in the characteristic polynomial for A.

It can thus be seen from Equations 29–31 that, at each sample, there are only 2n+1 multiplications and 2n additions for the controller conical form realization. This is drastically reduced over the (n+1) ×(n+1) multiplications and n×(n+1) additions for the realizations set out in Equation 21.

While this state transformation may be highly desirable for a SISO implementation, the canonical form does not generalize well for multiple input multiple output (MIMO) systems. Thus, in a MIMO implementation, bi-diagonal realizations can be employed to obtain a significant computational simplification.

For purposes of the present application, a bi-diagonal realization refers to a realization where the A matrix in Equation 21 is decoupled into a block diagonal matrix of the real eigenvalues and complex conjugate pairs. This results in a transformation of the realization in Equation 21 to the realization as follows:

$$z(k+1) = A_{bd} z(k) + B_{bd} u(k) \quad \text{Equation 32}$$
$$y(k) = C_{bd} z(k) + D u(k)$$

where $B_{bd}$, $C_{bd}$ and D are arbitrary matrices; and $$A_{bd} = \begin{matrix} \lambda_1 & & & & & \\ & \ldots & & & & \\ & & \lambda_r & & & \\ & & & \hat{A}_1 & & \\ & & & & \ldots & \\ & & & & & \hat{A}_c \end{matrix} \quad \text{Equation 33}$$

where r is the number of real eigenvalues of the controller;
C is the number of complex conjugate eigenvalue pairs (n=r+2C);
each $\lambda_i$ corresponds to the $i^{th}$ eigenvalue of A in Equation 21; and
each $\hat{A}_j \in R^{2\times 2}$ is a 2×2 matrix corresponding to the $j^{th}$ complex conjugate eigenvalue pair of A.

Thus, from Equations 32 and 33 it can be seen that for the bi-diagonal realization there will be n×(m+1)+p×(n+m)+2c multiplications and n×m+p×(n+m−1)+2c additions for each sample. In other words, for each sample, the bi-diagonal realization set out in Equations 32 and 33 has $n^2$-n-2c fewer multiplications and $n^2$-n-2c fewer additions. Further, as the number of states increases (relative to the number of inputs and outputs to the controller) the computation for the bi-diagonal realization is linear in the number of states, versus quadratic for the standard realization set out in Equation 21. It should also be noted that the bi-diagonal transformation can be applied before the transformations which are used to scale the states of the controller, and bound those states. This allows integrating states to be isolated prior to scaling in order to minimize or prevent overflow in the intermediate calculations.

3. Conversion of the Matrices to Fixed-Point Format

Because the digital signal processor is a fixed-point controller, the matrices which define the discrete-time controller must be converted to a fixed-point format in order for the controller to be implemented on a DSP. Floating point numbers can be converted to a fixed-point equivalent using fractional binary numbers. A fractional binary number is expressed as a binary number followed by a binary point followed by a binary fraction. For example, a fractional binary number can b e represented as follows:

$$(b_{N-1}, b_{N-2}, \ldots, b_1, b_0)_Q = \sum_{i=0}^{N-1} b_i 2^{i-Q} \quad \text{Equation 34}$$

where N is the word length (or number of bits in the binary word);
Q is the location of the binary point; and
($b_{N-1}$, $b_{n-2}$, . . . $b_1$, $b_0$) are the bits in the binary word.

For the purposes of the present application, fractional binary numbers will be denoted Qn, where n is the location of the binary point. For example, a Q15 fractional binary number represents a binary number with 15 bits after the binary point.

The elements of the matrices set out in the bi-diagonal realization in Equation 32 must be preferably converted to fractional binary numbers. In the preferred embodiment, this is accomplished by right-shifting the elements of each matrix until the matrix can be represented in the desired fractional binary number format. Thus, the fixed-point bi-diagonal realization set out in Equation 32 will be represented as follows:

$$z(k+1) = 2^{S_A} A_{bd}^{2_A} z(k) + 2^{S_B} B_{bd}^{S_B} u(k) \quad \text{Equation 35}$$
$$y(k) = 2^{S_C} C_{bd}^{S_C} z(k) + 2^{S_D} D^{S_D} u(k)$$

where $s_A$, $s_B$, $s_c$ and $s_D$ are positive numbers equal to the number of right shifts required to represent each respective matrix in fractional binary number (Qn) format; and $$A_{bd}^{S_A}, B_{bd}^{S_B}, C_{bd}^{S_C}, \text{ and } D_{bd}^{S_D}$$

correspond to Qn representations of $2^{-S_A} A_{bd}$, $2^{-S_B} B_{bd}$, $2_{-S}{}^c C_{bd}$, and $2^{-S_D} D_{bd}$, respectively.

In one preferred embodiment, the discrete-time controller realization set out in Equation 21 is implemented on a fixed-point, 16-bit digital signal processor with a standard arithmetic logic unit (ALU) supplying signed and unsigned multiply and addition instructions for 16-bit arguments. The products and sums are internally stored in 32 bit form. In one preferred embodiment, the processor is commercially designated as the TMS320C2xLP DSP core available from Texas Instruments. Empirical studies have shown that using 16 bits (i.e., Q15 format) for the controller matrices, measurements, and outputs, provides acceptable operation. However, 32 bits (Q31 format) was preferred for state arithmetic.

Thus, the present invention can be implemented as a method or in an apparatus and provides a highly advantageous technique for implementing a model-based controller in a disc drive. The matrices for a discrete time state-space controller realization are obtained and scaled as in blocks 340 and 342 in FIG. 15. The states are transformed to a desirable structure and the matrices are converted to fixed-point format as in block 344. This provides a MIMO servo controller on a fixed-point DSP for use in a disc drive (as in block 346) which exhibits low possibility of overflow, has a highly reduced requirement for computation time and memory capacity, and exhibits highly reduced quantization errors.

In one embodiment, scaling the controller states includes obtaining a diagonal matrix of the form set out in equation 26 and performing a state transformation using the diagonal matrix in order to arrive at a new controller realization as set out in equation 28. In the preferred embodiment, the state-space realization set out in equation 28 has a structure which reduces the number of required mathematical operations to compute that realization, over that require to compute a first state-space realization.

In one embodiment, the servo controller 170, 174 is a single input/single output controller and wherein transforming the first state-space realization to a second state-space realization includes transforming the first state-space realization to a canonical realization as set out in equation 29. In another embodiment, the converting step includes converting the matrices to a fractional binary format as generally set out in equation 34.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular drive or drive type while maintaining substantially the same functionality without departing from the scope and spirit of the present invention.

What is claimed is:

1. A method of implementing a model based servo controller in a digital signal processor (DSP) in a disc drive, the method comprising steps of:
   (a) obtaining a stable model of the servo controller;
   (b) obtaining matrices from a first discrete time state-space realization of the stable model of the servo controller;
   (c) scaling controller states of the servo controller to reduce a worst case bound on the controller states;
   (d) transforming the first state-space realization to a second state-space realization having a structure such that the number of required mathematical operations to compute the second realization increases linearly with an increase in a number of states of the controller relative to a number of inputs to, and outputs from, the controller; and
   (e) converting the matrices to a fixed-point format suitable for operation in the DSP.

2. The method of claim 1 wherein the scaling step comprises steps of:
   (c) (i) obtaining a diagonal matrix based on the worst case bound for the stable model of the servo controller; and
   (c) (ii) performing a state transformation using the diagonal matrix to obtain a second state-space realization of the stable model, the second state-space realization conforming to a desired worst case bound smaller than the worst case bound prior to scaling.

3. The method of claim 1 wherein the transforming step comprises transforming the first state-space realization to a second state-space realization having a structure which reduces the number of required mathematical operations to compute the second realization over that required to compute the first state-space realization at each sample.

4. The method of claim 2 wherein transforming the first state-space realization to a second state-space realization of the transforming step comprises transforming the first state-space realization to a bi-diagonal realization.

5. The method of claim 2 wherein the servo controller is a single-input/single-output controller and wherein transforming the first state-space realization to a second state-space realization of the transforming step comprises transforming the first state-space realization to a canonical realization.

6. The method of claim 1 wherein the transforming step is performed prior to the scaling step.

7. The method of claim 1 wherein the converting step comprises converting the matrices to a fractional binary number format.

8. The method of claim 7 wherein the converting step comprises converting the matrices to a format generally of the form Qn wherein Q is a fractional binary number and n is a number of bits in Q after a binary point.

9. The method of claim 8 wherein converting the matrices to fractional binary number format comprises:
   (e) (i) converting the matrices to one of a group of formats consisting generally of the form Q15 and Q31.

10. A model-based servo controller in a servo system in a disc drive obtained by performing the steps of:
    (a) obtaining a stable model of the servo controller;
    (b) obtaining matrices from a first discrete time state-space realization of the stable model of the servo controller;
    (c) scaling controller states of the servo controller to reduce a worst case bound on the controller states;
    (d) transforming the first state-space realization to a second state-space realization having a structure such that the number of required mathematical operations to compute the second realization increases linearly with an increase in a number of states of the controller relative to a number of inputs to, and outputs from, the controller; and
    (e) converting the matrices to a fixed-point format suitable for operation in a digital signal processor (DSP).

11. The method of claim 10 wherein the scaling step comprises the steps of:
    (c)(i) obtaining a diagonal matrix based on the worst case bound for the stable model of the servo controller; and
    (c)(ii) performing a state transformation using the diagonal matrix to obtain a second state-space realization of the stable model, the second state-space realization conforming to a desired worst case bound smaller than the worst case bound prior to scaling.

12. The method of claim 10 wherein the transforming step comprises transforming the first state-space realization to a bi-diagonal realization.

13. The method of claim 10 wherein the transforming step comprises transforming the first state-space realization to a canonical realization.

14. The method of claim 10 wherein the transforming step is performed prior to scaling controller states.

15. The method of claim 10 wherein the converting step comprises converting the matrices to fractional binary number format.

* * * * *

UNITED STATES PATENT AND TRADEMARK OFFICE
CERTIFICATE OF CORRECTION

PATENT NO. : 6,101,058
DATED : August 8, 2000
INVENTOR(S) : John C. Morris It is certified that error appears in the above-identified patent and that said Letters Patent is hereby corrected as shown below:

Equations: Page 2, line 49,

" $2^{-s_A} A_{bd}$, $2^{-s_B} B_{bd}$, $2^{-s_C} C_{bd}$, and $2^{-s_D} D_{bd}$, "

should be -- $2^{-s_A} A_{bd}$, $2^{-s_B} B_{bd}$, $2^{-s_c} C_{bd}$, and $2^{-s_D} D_{bd}$, --.

Signed and Sealed this

First Day of May, 2001

Attest:

NICHOLAS P. GODICI

Attesting Officer     *Acting Director of the United States Patent and Trademark Office*